US012671739B1

(12) United States Patent
Chennuri

(10) Patent No.: US 12,671,739 B1
(45) Date of Patent: *Jun. 30, 2026

(54) PROACTIVE MANAGEMENT OF SERVICE CONNECTIONS

(71) Applicant: Amazon Technologies, Inc., Seattle, WA (US)

(72) Inventor: Karun Kumar Chennuri, Bothell, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,923

(22) Filed: Nov. 1, 2023

Related U.S. Application Data

(63) Continuation of application No. 17/955,063, filed on Sep. 28, 2022, now Pat. No. 11,856,064.

(51) Int. Cl.
 *H04L 67/141* (2022.01)
 *H04L 67/2895* (2022.01)
(52) U.S. Cl.
 CPC ........ *H04L 67/141* (2013.01); *H04L 67/2895* (2013.01)
(58) Field of Classification Search
 CPC .......................... H04L 67/141; H04L 67/2895
 See application file for complete search history.

(56) References Cited

U.S. PATENT DOCUMENTS 6,594,690 B2 7/2003 Cantwell
9,910,997 B1 3/2018 Brail et al.

| | | | |
|---|---|---|---|
| 11,140,358 B1 * | 10/2021 | Adcock | G06Q 10/1095 |
| 11,856,064 B1 * | 12/2023 | Chennuri | H04L 67/568 |
| 2015/0341822 A1 | 11/2015 | Ma | |
| 2016/0269404 A1 | 9/2016 | Engelhart | |
| 2017/0099199 A1 | 4/2017 | Bauer et al. | |

(Continued)

OTHER PUBLICATIONS

Office Action for U.S. Appl. No. 17/955, 81, mailed on Sep. 14, 2023, Inventor #1 Karun Kumar Chennuri, "Pass-Through Proxy for Managing Service Connections", 9 pages.

*Primary Examiner* — Michael A Keller
*Assistant Examiner* — Thao D Duong
(74) *Attorney, Agent, or Firm* — Perilla Knox & Hildebrandt LLP; Thomas B. Hildebrandt

(57) ABSTRACT

Techniques for a Predictive Connection Manager Service (PCMS) to predict when client applications will send service requests to backend services, and proactively establishes connections, caches data, or takes other actions, to reduce latencies between receipt of and response to these service requests. The PCMS analyzes historical usage data for the client applications to identify usage patterns, and uses those usage patterns to proactively scale resources to handle service requests. The PCMS can be implemented as a pass-through proxy for client applications to reduce frictions for managing how users interact with backend services. For instance, the PCMS can install client-side drivers such that updates or patches for the drivers need only be installed on the PCMS rather than on each client device. Further, the PCMS provides interfaces through which users can develop custom drivers for backend services, and also manages software drivers for different service provider networks, thus offering multi-provider connectors.

20 Claims, 18 Drawing Sheets

(56)                    References Cited

U.S. PATENT DOCUMENTS

| | | | |
|---|---|---|---|
| 2017/0206353 A1* | 7/2017 | Jai | G06F 21/565 |
| 2018/0014243 A1* | 1/2018 | Peng | H04W 48/20 |
| 2018/0049071 A1 | 2/2018 | Xu et al. | |
| 2019/0182298 A1* | 6/2019 | Moon | H04M 3/493 |
| 2020/0192689 A1 | 6/2020 | Smith, IV et al. | |
| 2020/0358713 A1 | 11/2020 | Jain et al. | |
| 2021/0152455 A1* | 5/2021 | Castle | H04L 43/0876 |
| 2022/0214869 A1 | 7/2022 | Fried | |
| 2023/0148314 A1* | 5/2023 | Singh | G06F 9/45558 |
| | | | 718/1 |
| 2023/0275886 A1 | 8/2023 | Malik et al. | |
| 2024/0403603 A1* | 12/2024 | Fernandez-Montes Cuberta | |
| | | | G06N 3/0442 |

* cited by examiner

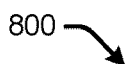

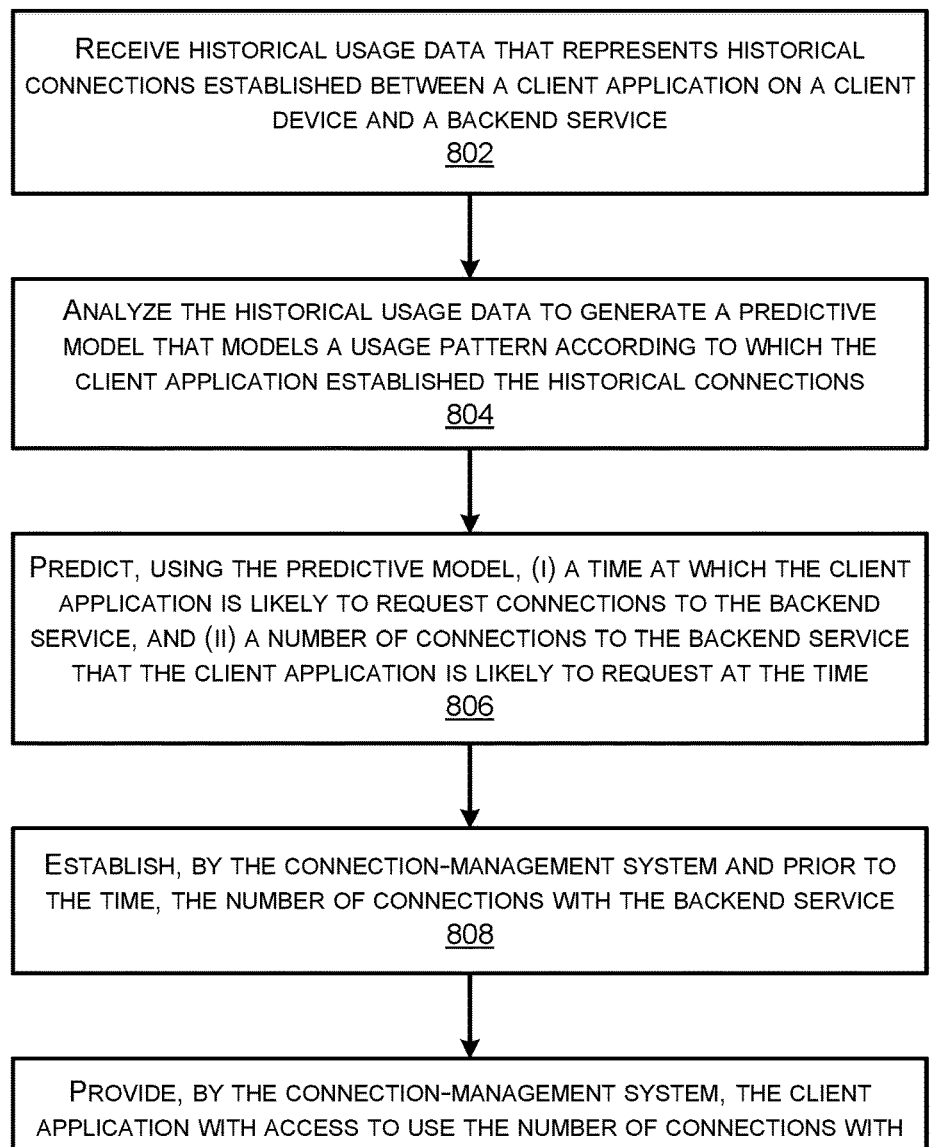

RECEIVE HISTORICAL USAGE DATA THAT REPRESENTS HISTORICAL CONNECTIONS ESTABLISHED BETWEEN A CLIENT APPLICATION ON A CLIENT DEVICE AND A BACKEND SERVICE
802

ANALYZE THE HISTORICAL USAGE DATA TO GENERATE A PREDICTIVE MODEL THAT MODELS A USAGE PATTERN ACCORDING TO WHICH THE CLIENT APPLICATION ESTABLISHED THE HISTORICAL CONNECTIONS
804

PREDICT, USING THE PREDICTIVE MODEL, (I) A TIME AT WHICH THE CLIENT APPLICATION IS LIKELY TO REQUEST CONNECTIONS TO THE BACKEND SERVICE, AND (II) A NUMBER OF CONNECTIONS TO THE BACKEND SERVICE THAT THE CLIENT APPLICATION IS LIKELY TO REQUEST AT THE TIME
806

ESTABLISH, BY THE CONNECTION-MANAGEMENT SYSTEM AND PRIOR TO THE TIME, THE NUMBER OF CONNECTIONS WITH THE BACKEND SERVICE
808

PROVIDE, BY THE CONNECTION-MANAGEMENT SYSTEM, THE CLIENT APPLICATION WITH ACCESS TO USE THE NUMBER OF CONNECTIONS WITH THE BACKEND SERVICE AT LEAST BY THE TIME
810

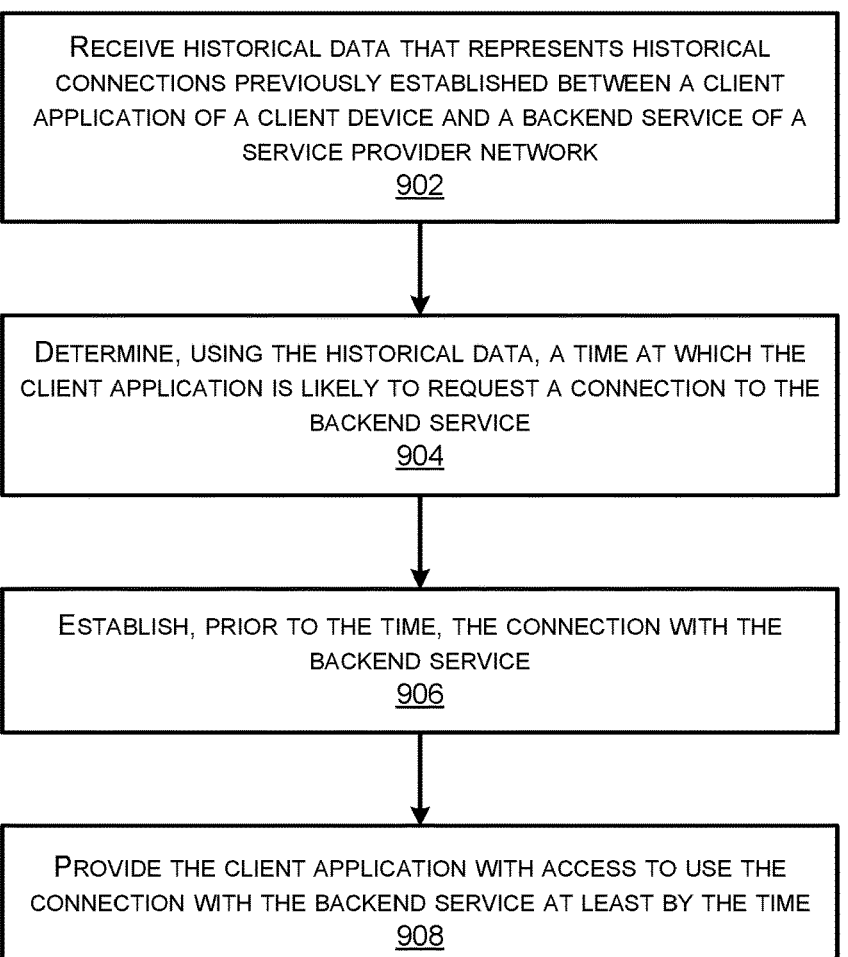

RECEIVE HISTORICAL DATA THAT REPRESENTS HISTORICAL
CONNECTIONS PREVIOUSLY ESTABLISHED BETWEEN A CLIENT
APPLICATION OF A CLIENT DEVICE AND A BACKEND SERVICE OF A
SERVICE PROVIDER NETWORK
902

DETERMINE, USING THE HISTORICAL DATA, A TIME AT WHICH THE
CLIENT APPLICATION IS LIKELY TO REQUEST A CONNECTION TO THE
BACKEND SERVICE
904

ESTABLISH, PRIOR TO THE TIME, THE CONNECTION WITH THE
BACKEND SERVICE
906

PROVIDE THE CLIENT APPLICATION WITH ACCESS TO USE THE
CONNECTION WITH THE BACKEND SERVICE AT LEAST BY THE TIME
908

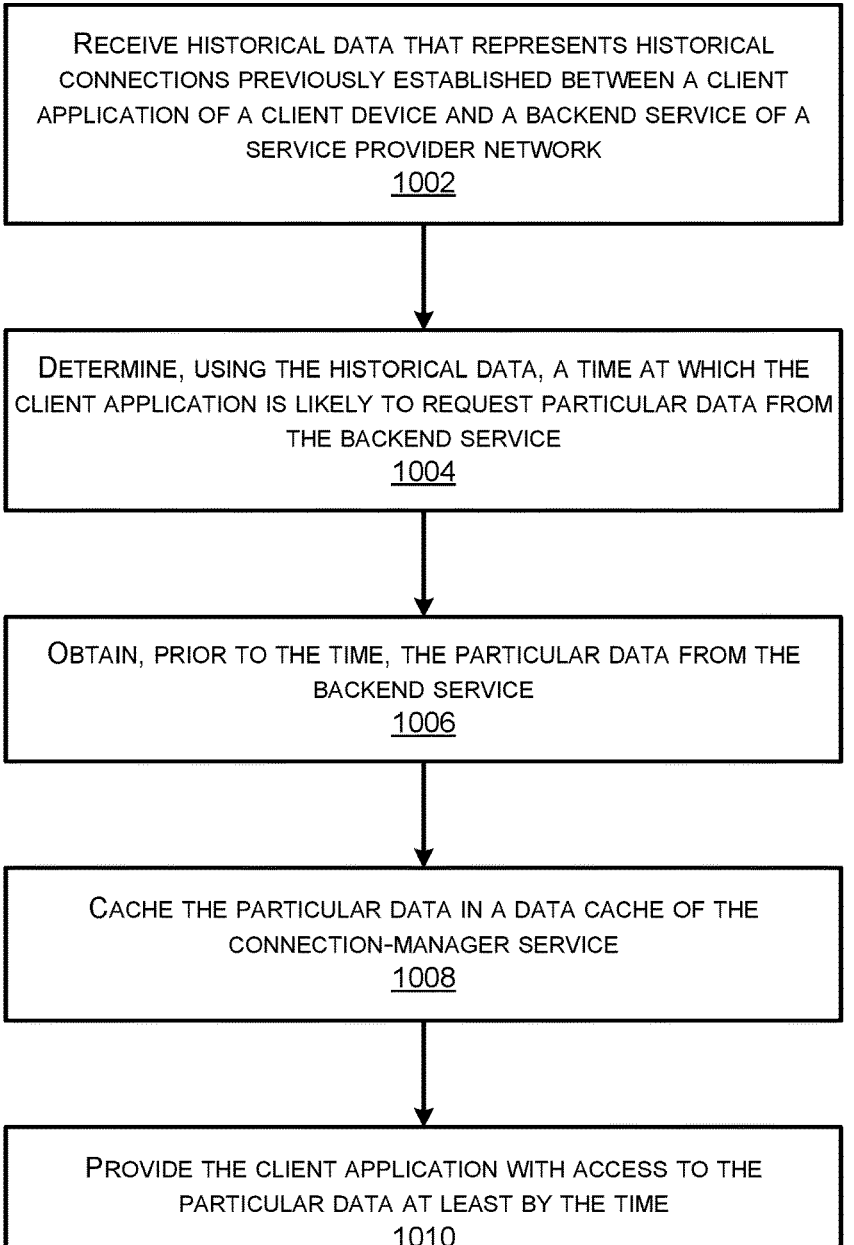

RECEIVE HISTORICAL DATA THAT REPRESENTS HISTORICAL CONNECTIONS PREVIOUSLY ESTABLISHED BETWEEN A CLIENT APPLICATION OF A CLIENT DEVICE AND A BACKEND SERVICE OF A SERVICE PROVIDER NETWORK
1002

DETERMINE, USING THE HISTORICAL DATA, A TIME AT WHICH THE CLIENT APPLICATION IS LIKELY TO REQUEST PARTICULAR DATA FROM THE BACKEND SERVICE
1004

OBTAIN, PRIOR TO THE TIME, THE PARTICULAR DATA FROM THE BACKEND SERVICE
1006

CACHE THE PARTICULAR DATA IN A DATA CACHE OF THE CONNECTION-MANAGER SERVICE
1008

PROVIDE THE CLIENT APPLICATION WITH ACCESS TO THE PARTICULAR DATA AT LEAST BY THE TIME
1010

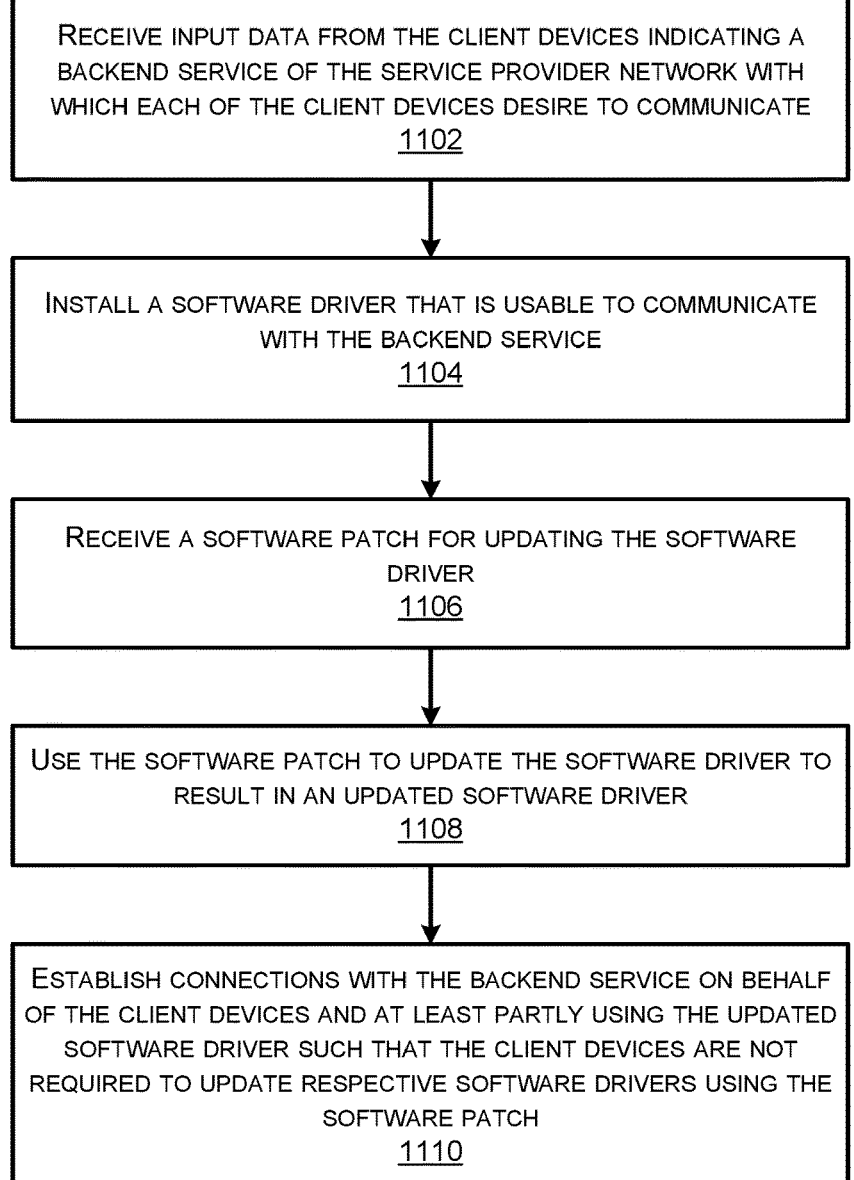

RECEIVE INPUT DATA FROM THE CLIENT DEVICES INDICATING A
BACKEND SERVICE OF THE SERVICE PROVIDER NETWORK WITH
WHICH EACH OF THE CLIENT DEVICES DESIRE TO COMMUNICATE
1102

INSTALL A SOFTWARE DRIVER THAT IS USABLE TO COMMUNICATE
WITH THE BACKEND SERVICE
1104

RECEIVE A SOFTWARE PATCH FOR UPDATING THE SOFTWARE
DRIVER
1106

USE THE SOFTWARE PATCH TO UPDATE THE SOFTWARE DRIVER TO
RESULT IN AN UPDATED SOFTWARE DRIVER
1108

ESTABLISH CONNECTIONS WITH THE BACKEND SERVICE ON BEHALF
OF THE CLIENT DEVICES AND AT LEAST PARTLY USING THE UPDATED
SOFTWARE DRIVER SUCH THAT THE CLIENT DEVICES ARE NOT
REQUIRED TO UPDATE RESPECTIVE SOFTWARE DRIVERS USING THE
SOFTWARE PATCH
1110

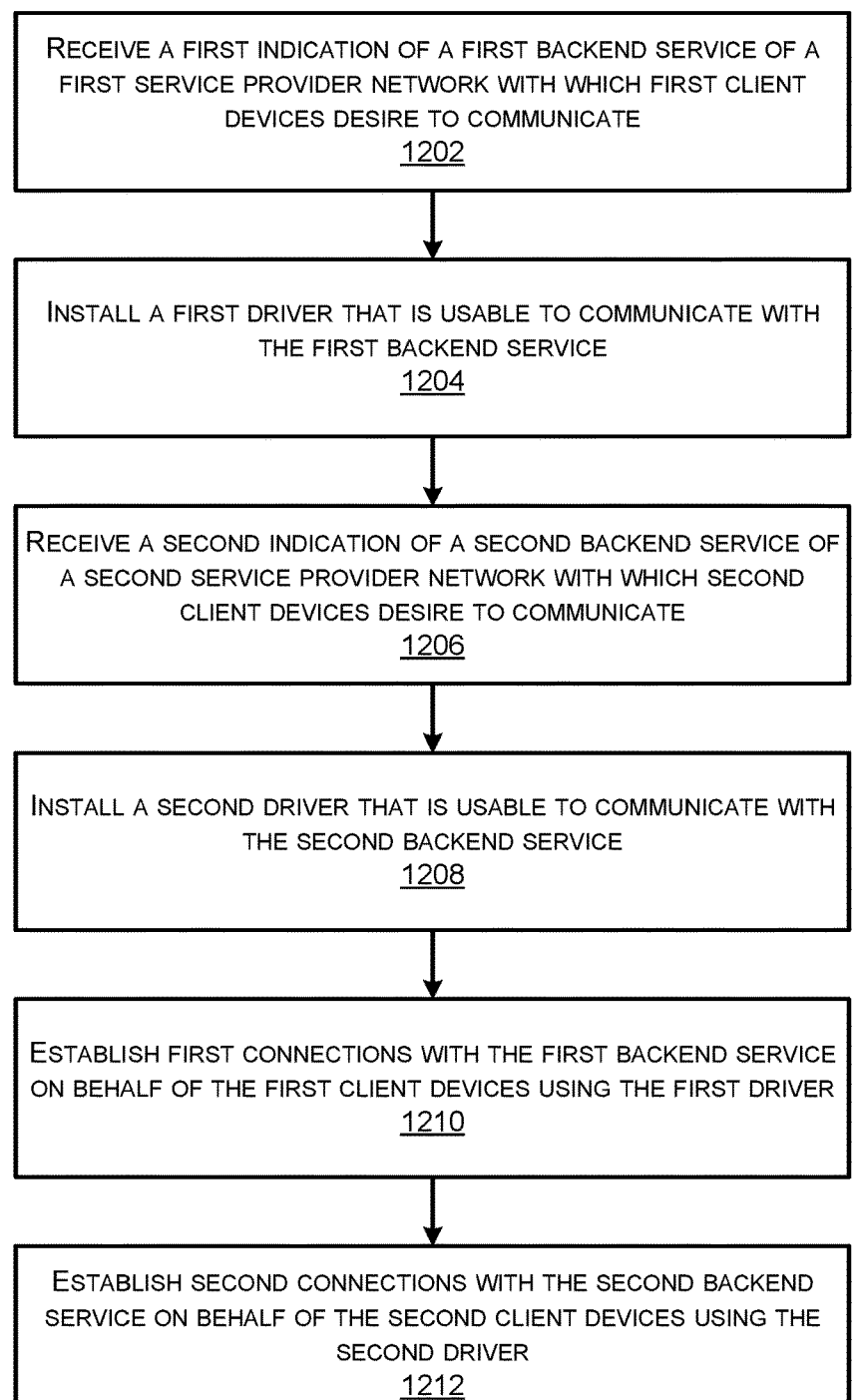

RECEIVE A FIRST INDICATION OF A FIRST BACKEND SERVICE OF A FIRST SERVICE PROVIDER NETWORK WITH WHICH FIRST CLIENT DEVICES DESIRE TO COMMUNICATE
1202

INSTALL A FIRST DRIVER THAT IS USABLE TO COMMUNICATE WITH THE FIRST BACKEND SERVICE
1204

RECEIVE A SECOND INDICATION OF A SECOND BACKEND SERVICE OF A SECOND SERVICE PROVIDER NETWORK WITH WHICH SECOND CLIENT DEVICES DESIRE TO COMMUNICATE
1206

INSTALL A SECOND DRIVER THAT IS USABLE TO COMMUNICATE WITH THE SECOND BACKEND SERVICE
1208

ESTABLISH FIRST CONNECTIONS WITH THE FIRST BACKEND SERVICE ON BEHALF OF THE FIRST CLIENT DEVICES USING THE FIRST DRIVER
1210

ESTABLISH SECOND CONNECTIONS WITH THE SECOND BACKEND SERVICE ON BEHALF OF THE SECOND CLIENT DEVICES USING THE SECOND DRIVER
1212

FIG. 12

PROACTIVE MANAGEMENT OF SERVICE CONNECTIONS

RELATED APPLICATIONS

This application claims priority to and is a continuation of U.S. patent application Ser. No. 17/955,063, filed on Sep. 28, 2022, the entire contents of which are incorporated herein by reference.

BACKGROUND

Service providers offer computing infrastructures and services that fulfill users' computing-service needs without the users having to invest in and maintain the computing infrastructure required to implement these services. These service providers maintain networks of managed computing resources and functionality to implement various types of scalable, on-demand services to provide to users. As users in the workforce continue to work remotely, these service providers continue to receive large amounts of service requests from users that peak at certain times of the day. For instance, users often log onto their computers and access their client applications at similar times of the day, such as in the mornings when users start work, around midday when users log back onto their computers after lunch, and so forth. Due to the large amounts of service requests received, service provider networks can experience difficulties in handling all of the requests during these peak times, which can result in poor user experience.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 8 illustrates a flow diagram of an example method for a PCMS to generate and use a predictive model to determine a time at which a client application is likely to request connections to a backend service and a number of the connections, and to establish the number of connections with the backend service on behalf of the client application prior to the time.

FIG. 9 illustrates a flow diagram of an example method for a PCMS to determine a time at which a client application is likely to request a connection to a backend service, and to establish the connection with the backend service on behalf of the client application prior to the time.

FIG. 10 illustrates a flow diagram of an example method for a PCMS to determine a time at which a client application is likely to request a particular data from a backend service, and to retrieve and cache the particular data on behalf of the client application prior to the time.

FIG. 11 illustrates a flow diagram of an example method for a PCMS to install a software driver to communicate with a backend service, update the software driver using a software patch, and using the updated software driver to establish connections with the backend service on behalf of a client application.

FIG. 12 illustrates a flow diagram of an example method for a PCMS to install software drivers to communicate with backend services of at least two service provider networks, and acting as a proxy and using the drivers, establishing connections with the at least two service provider networks.

DETAILED DESCRIPTION

Figure 1:
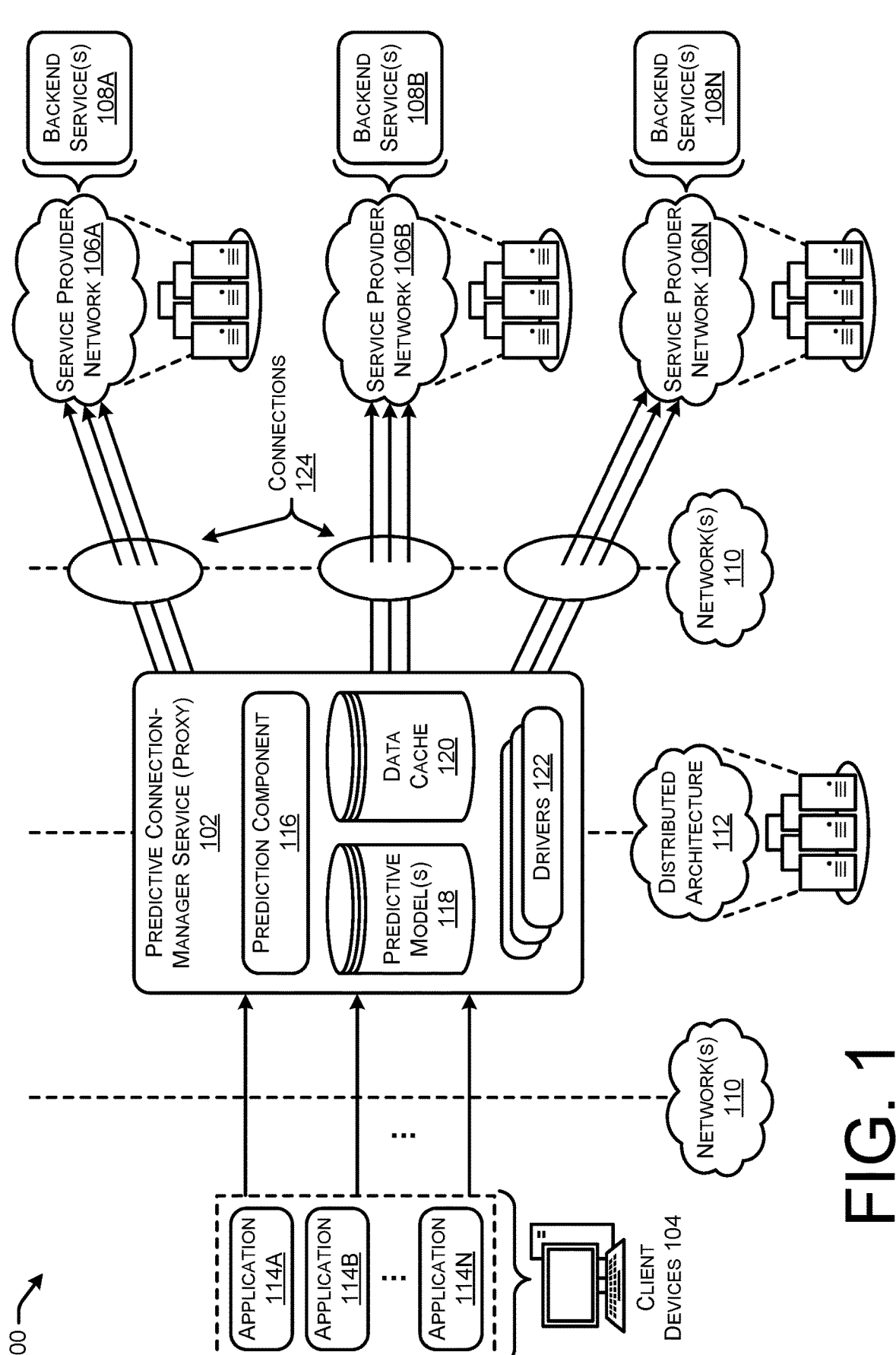
FIG. 1 illustrates a system-architecture diagram of an example environment in which a predictive connection-manager service (PCMS) predicts when client devices are going to request data from, and connections to, backend services, and proactively retrieves the data and establishes the connections to reduce latency. Additionally, the PCMS behaves as a pass-through proxy in order to simplify how client devices interact with service provider networks.

Reducing latencies between receiving and responding to service requests of client applications, and minimizing frictions in communications between client applications and backend services, are key concerns of service provider networks. This disclosure describes techniques for implementing a Predictive Connection Manager Service (PCMS) that predicts when client applications will send service requests to backend services, and proactively establishes connections, caches data, or takes other actions to reduce latencies between receipt of and response to these service requests. The PCMS analyzes historical usage data for the client applications to identify usage patterns, such as an application establishing a connection to a backend service at a same time each morning, and uses those usage patterns to proactively scale resources to handle service requests. This can help the PCMS reduce bottlenecks caused from receiving large amounts of service requests during periods of time, which results in more efficient utilization of the PCMS resources and decreased latencies in responding to service requests.

The PCMS can be implemented as a distributed, pass-through proxy for the client applications in order to reduce frictions for managing how users interact with backend services. For instance, the PCMS can install client-side drivers such that updates or patches for the drivers need only be installed on the PCMS rather than on each client device. Further, the PCMS provides interfaces through which users can develop custom drivers for backend services, and also manages software drivers for different service provider networks, thus offering multi-provider connectors. In some examples, to perform the techniques described herein, the PCMS may be positioned between client applications running on client devices and backend services and serve as a middleman, or proxy, by handling communications between the client applications and the backend services.

The disclosed PCMS addresses concerns around high latencies and inefficient usage of computing resources caused by high volumes of service requests by predicting service request and proactively responding to the requests prior to receipt. To predict when services requests are going to be received from client applications, the PCMS collects historical-usage data that represents historical connections previously established between client applications and backend services. The historical-usage data may indicate times at which service requests were received, client applications from which the service requests were received, backend services to which the services requests were sent, the types of the service requests (e.g., data requests, types and/or numbers of connections requested, etc.), and/or other data. The PCMS can analyze the historical-usage data to identify usage patterns of client applications with respect to sending service requests during a period of time. The PCMS may generate predictive models (e.g., machine-learning (ML) models, heuristic- or rule-based models, etc.) that represent these usage patterns and may be used to predict when client applications are likely to send service requests, and potentially predict other request information, such as types of service requests, numbers of service requests, and so forth.

Using the predictive models, the PCMS can take proactive actions prior to the predicted times at which service requests are likely to be received from client applications. For instance, the PCMS can proactively establish connections with backend services such that the connections are more quickly available for use by the client applications after sending service requests. Additionally, the PCMS may predict how many connections are likely to be requested by client applications, scale up resources needed to establish the connections, and proactively establish the predicted number of connections prior to the predicted times. As another example, the PCMS may use the predictive models predict different data (e.g., reports, files, etc.) client applications are likely to request at particular times. The PCMS may proactively (e.g., prior to the predicted times) begin to retrieve the data from the appropriate backend services and cache the data in data caches of the PCMS such that the data can be quickly provided to the client applications upon request.

In some instances, client applications may desire and attempt to establish many connections with a particular backend service, which results in many service requests. Additionally, or alternatively, malicious entities can use bots to flood servers of backend services with service requests in order to overwhelm the servers. Traditionally, backend services have not been able to limit how many service requests are received from entities, such as client applications or malicious bots. To solve this issue, the PCMS may implement rate limiting on client applications by restricting the number of requests the client applications can send to backend services in a given period of time. That is, the PCMS may assign rate limits (e.g., 10 requests per second, 100 requests per second, etc.) to client applications based on, for example, application type and act as a gateway to limit the number of service requests forwarded from the client applications to the backend services.

The PCMS may be implemented as a distributed, pass-through proxy for the client applications in order to reduce frictions for managing how users interact with backend services. Generally, the PCMS may behave as a pass-through proxy such that it masquerades as the backend services for which it is proxying, and responds to the client applications as if the backend services were responding. Traditionally, client applications or devices have installed client-side drivers that are used to communicate with backend services. In some instances, each backend service may have their own respective drivers, resulting in client applications or devices having to install and manage many drivers. Thus, when an update or patch is released for a driver (e.g., to remedy a zero-day vulnerability), all client applications or devices that use the driver must update their respective drivers. To alleviate this burden, the PCMS may install the client-side drivers such that updates or patches for the drivers need only be installed on the PCMS rather than on each client device.

Additionally, client applications often desire to establish connections with, and receive data from, services that have been developed by developers of client applications (e.g., third party services, enterprise services, non-cloud-based services, etc.). To accommodate this, the PCMS provides interfaces through which users can develop custom drivers for these backend services. Further, client applications and/ or devices often desire to communicate with backend services that are provided, managed, and/or hosted by different service providers (e.g., different cloud-based platforms). Thus, in some examples the PCMS may also install and manage software drivers for different service provider networks, thus offering multi-provider connectors.

Along with managing service requests and connections on behalf of client applications, the PCMS may further provide various metrics to client applications and users thereof. For instance, the PCMS may monitor connections to backend services to determine that a service is becoming, or has become, unhealthy in some respect (e.g., limited access, oversubscription of computing resources, etc.). The PCMS may notify the client application and user of the health of the service, and potentially take various actions, such as establishing a new connection to a healthier backend node running the service. The PCMS may further provide metrics to give users a snapshot view of active connections versus stale/unused connections such that the users may determine how to manage connections more efficiently.

According to the techniques described herein, the PCMS may reduce latencies between receiving and responding to service requests of client applications, and improve the utilization of computing resources used to handle service requests. Additionally, the PCMS may reduce frictions for managing how users interact with backend services. For instance, the PCMS can install client-side drivers such that updates or patches for the drivers need only be installed on the PCMS rather than on each client device. Accordingly, the PCMS may perform techniques that solve problems rooted in computer technology, such as increasing efficiencies around handling service requests from client applications, which in turn improves the utilization of computing resources used to handle service requests, and reduces the amount of time taken to handle service requests.

The techniques described herein are with reference to a service provider network, such as a cloud provider network or platform. However, the techniques are equally applicable to any network and in any environment. For example, the PCMS may perform the techniques described herein for on-premises networks and/or other environments.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a predictive connection-manager service (PCMS) 102 predicts when client devices 104 are going to request data from, and connections to, backend services 108 or service provider networks 106, and proactively retrieves the data and establishes the connections to reduce latency. Additionally, the PCMS 102 behaves as a pass-through proxy in order to simplify how client devices 104 interact with service provider networks 106.

The service provider networks 102 may be operated and/or managed by respective service providers and may provide various services to users to fulfil their computing resource needs, such as cloud-based computing resources and services. For instance, users may operate client devices 104 in order to register for use of the computing resources and/or backend services 108 of the service provider networks 106. The service provider networks 106 may include, or be associated with, the PCMS 102 that predicts when client applications 114 will send service requests to backend services 106, and proactively establishes connections, caches data, or takes other actions to reduce latencies between receipt of and response to these service requests.

The client devices 104 may be any type of computing device, such as user devices (e.g., smart phones, tablets, wearable devices, personal computers, etc.), Internet of Things (IoT) device (e.g., sensors, smart appliances, medical sensors, security devices, etc.), network devices (e.g., routers, access points, servers, etc.), and/or any other type of device that communicates with service provider networks 106 and backend services 108. The client devices 104 may run one or more applications 114A, 114B, and 114N (where "N" is any integer of 1 or greater). The applications 114 may be any type of application executed on client devices 104, such as a web browser, a software application, and/or any type of client-side application 114. The client devices 104 may be operated by users that desire to interact with backend services 108, such as by establishing network connections (e.g., secure tunnels, application programming interface (API) calls, command line interfaces, etc.) with the backend services, and/or obtaining various types of data from the backend services 108. The service provider networks 106 may be separate networks of computing resources and backend services 108, and may be managed or operated by different service providers. In some instances, the service provider networks 106 may include one or more of cloud-provider platforms/networks, cloud-based software providers, customer relationship management (CRM) service networks, on-premises networks, enterprise networks, and so forth. The backend services 108 may generally comprise any type of service that performs operations with or on behalf of client devices 104, such as performing service operations, data operations, and so forth.

Traditionally, the applications 114 would send service requests to the service provider networks 106 in order to interact or communicate with the backend services 108. However, various issues arise around this traditional platform, as noted above, such as latency in handling surges of service requests, inefficient scaling of resources to handle the service requests, and so forth.

The PCMS 102 may be included in, or deployed according to, a distributed architecture 112 that can be called by the client applications 114. For instance, the PCMS 102 may be deployed as clusters of containers running on servers of data centers across different regions or subnetworks of the service provider networks 106. However, the PCMS 102 may run in any network or at any location, such as in the backbone infrastructure of private and/or public networks. However, the PCMS 102 may be a centralized service as well, and may be implemented using any technology (e.g., virtual machines, bare metal servers, containers, processes, serverless functions, etc.). Thus, the PCMS 102 may be either centralized or distributed, and be supported by one or more computing devices. In some embodiments, the PCMS 102 may run, partially or entirely, as an application 114 on the client devices 104 themselves.

Rather than having the applications 114 send service requests directly to the service provider networks 106 and associated backend services 108, the PCMS 102 may serve as a proxy that facilitates communications between the applications 114 of the client devices 104 and the backend services 108 of the service provider networks 106.

To predict when services requests are going to be received from client applications 114, the PCMS 102 collects historical-usage data that represents historical connections previously established between the client applications 114 and backend services 108. The historical-usage data may indicate times at which service requests were received, client applications 114 from which the service requests were received, backend services 108 to which the services requests were sent, and types of the service requests (e.g., data requests, types and/or numbers of connections requested, etc.). The PCMS 102 can analyze the historical-usage data to identify usage patterns of client applications 114 with respect to sending service requests during a period of time. The PCMS 102 may generate predictive models 118 (e.g., machine-learning (ML) models, heuristic- or rule-based models, etc.) that represent these usage patterns and may be used to predict when client applications 114 are likely to send service requests, and potentially predict other request information, such as types of service requests, numbers of service requests, and so forth.

Using the predictive models 118, a prediction component 116 of the PCMS 102 can take proactive actions prior to the predicted times at which service requests are likely to be received from client applications 114. For instance, the prediction component 116 can proactively establish connections 124 with backend services 108 such that the connections 124 are more quickly available for use by the client applications 114 after sending service requests. Additionally, the prediction component 116 may predict how many connections 124 are likely to be requested by client applications 114, scale up resources needed to establish the connections 124, and proactively establish the predicted number of connections 124 prior to the predicted times.

In some instances, the prediction component 116 may use the predictive models 118 predict different data (e.g., reports, files, etc.) client applications 114 are likely to request at particular times. The prediction component 116 may proactively (e.g., prior to the predicted times) begin to retrieve the data from the appropriate backend services 108 and cache the data in a data cache 120 of the PCMS 102 such that the data can be quickly provided to the client applications 114 upon request.

In some instances, client applications 114 may desire and attempt to establish many connections 124 with a particular backend service 108, which results in many service requests. Additionally, or alternatively, malicious entities can use bots to flood servers of backend services 108 with service requests in order to overwhelm the servers. Traditionally, backend services 108 have not been able to limit how many service requests are received from entities, such as client applications 114 or malicious bots. To solve this issue, the PCMS 102 may implement rate limiting on client applications 114 by restricting the number of requests the client applications 114 can send to backend services 108 in a given period of time. That is, the PCMS 102 may assign rate limits (e.g., 10 requests per second, 100 requests per second, etc.) to client applications 114 based on, for example, application type and act as a gateway to limit the number of service requests forwarded from the client applications 114 to the backend services 108.

As noted above, the PCMS 102 may be implemented as a pass-through proxy for the client applications in order to reduce frictions for managing how users interact with backend services 108. Generally, the PCMS 102 may behave as a pass-through proxy such that it masquerades as the backend services 108 for which it is proxying, and responds to the client applications 114 as if the backend services 108 were responding. Traditionally, client applications 114 or devices 104 have installed client-side drivers that are used to communicate with backend services 108. In some instances, each backend service 108 may have their own respective drivers, resulting in client applications 114 or devices 104 having to install and manage many drivers. Thus, when an update or patch is released for a driver (e.g., to remedy a zero-day vulnerability), all client applications 114 that use the driver must update their respective drivers. To alleviate this burden, the PCMS 102 may install the client-side drivers 122 such that updates or patches for the drivers 122 need only be installed on the PCMS 102 rather than on each client device 104. The PCMS 102 may use the drivers 122 to communicate with the backend services 108 appearing to the backend services 108 as if the PCMS 102 is the client applications 114 themselves. Generally, the drivers 122 may comprise software or code that represent instructions or permissions that instructor inform the PCMS 102 how to communicate with the backend services 108 and/or the applications 114. The PCMS 102 may store client-side drivers 122 that enable the PCMS 102 to communicate with the backend services 108 as if it were client applications 114. Additionally, or alternatively, the PCMS 102 may include service-side drivers 122 that enable the PCMS 102 to communicate with the client applications 114 as if they were talking to the backend services 108 themselves.

Additionally, client applications 114 often desire to establish connections 124 with, and receive data from, services 108 that have been developed by developers of client applications 114 (e.g., third party services, enterprise services, non-cloud-based services, etc.). To accommodate this, the PCMS 102 provides interfaces through which users can design custom drivers 122 for these backend services 108. Further, client applications 114 and/or devices 104 often desire to communicate with backend services 108 that are provided, managed, and/or hosted by different service providers 106 (e.g., different cloud-based platforms). Thus, in some examples the PCMS 102 may also install and manage software drivers 122 for the different service provider networks 106, thus offering multi-provider connectors.

In some examples, one or more of the service provider networks 106 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 106 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 106 may provide on-demand, scalable computing services to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/ or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users 302 choose to deploy their virtual computing systems to provide network-based services for their own use and/or for use by their users or client.

The cloud provider network 106 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network 106, which may be provisioned in user accounts.

Generally, the PCMS 102, and components thereof, may comprise computing devices, systems, or other hardware along with software, firmware, and/or other logic that is supported one computing device, or across more computing devices in a network, such as portions of one or more of the service provider networks 106. Additionally, the PCMS 102 may comprise a system of other devices. The techniques described herein are generally described with respect to a service provider network 106, such as a cloud provider network or platform. However, the techniques are generally applicable for any network, such as on-premises networks, hybrid networks, and so forth.

Figure 2A:
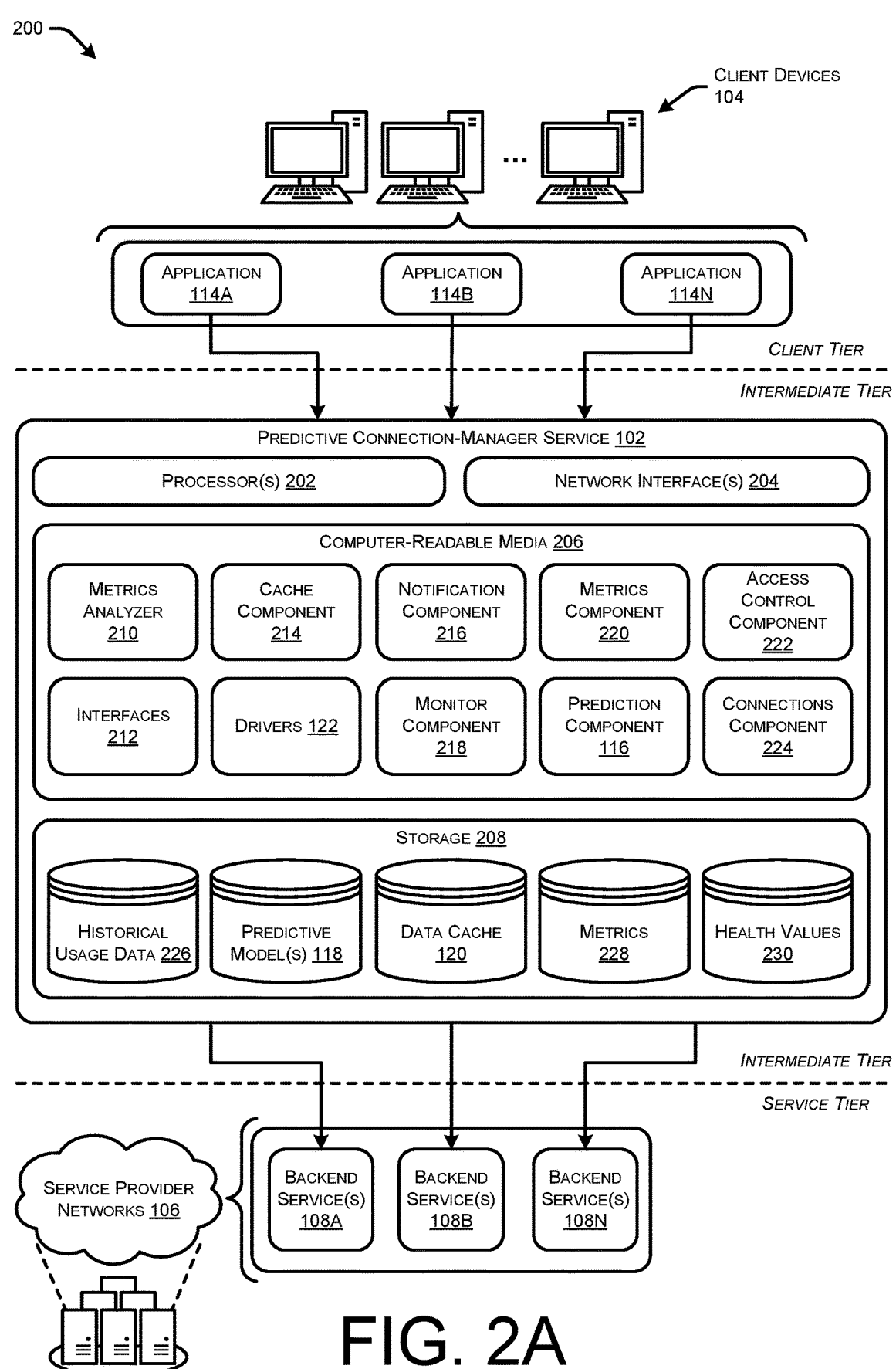
FIG. 2A illustrates a component diagram of example components of a PCMS that proactively establishes network connections and/or caches data on behalf of client devices, and behaves as a pass-through proxy in order to simplify how client devices interact with service provider networks.

FIG. 2A illustrates a component diagram 200 of example components of a PCMS 102 that proactively establishes network connections 124 and/or caches data on behalf of client devices 104, and behaves as a pass-through proxy in order to simplify how client devices 104 interact with service provider networks 106.

As illustrated, the PCMS 102 may include one or more hardware processors 202 (processors), one or more devices, configured to execute one or more stored instructions. The processor(s) 202 may comprise one or more cores. Further, the PCMS 102 may include one or more network interfaces 204 configured to provide communications between the PCMS 102 and other devices, such as the client devices 104 in a client tier, the backend services 108 in the service tier, and/or other systems or devices in and/or remote from the service provider networks 106. The network interfaces 204 may include devices configured to couple to various networks, such as the network(s) 110, which may include one or more of personal area networks (PANs), wired and wireless local area networks (LANs), wired and wireless wide area networks (WANs), and so forth.

The PCMS 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 106. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the PCMS 102 may include a data store, or storage 208 which may comprise one, or multiple, repositories or other storage locations for persistently storing and managing collections of data such as databases, simple files, binary, and/or any other data. The storage 208 may include one or more storage locations that may be managed by one or more database management systems.

The computer-readable media 206 may store portions, or components, of the PCMS 102 described herein. For instance, the computer-readable media 206 may store and/or execute a metrics analyzer 210 that monitors and tracks various metrics 228 associated with the service requests and connections of the client applications 114. For instance, the metrics analyzer 210 may track numbers of connection requests sent from individual client applications 114, number of active and stale connections 124 for applications 114 (e.g., used versus unused connections), scaling needs of connections 124 and/or applications 112, historical usage data for the client applications 114, and so forth.

The computer-readable media 206 may store and/or execute interfaces through which users can interact with and query the PCMS 102. The interfaces 212 may include APIs, command line interfaces, text/code editors, and/or other interfaces through which users may communicate with the PCMS 102 and develop custom drivers 122.

The computer-readable media 206 may store and/or execute a notification component 216 configured to provide users associated with client applications 114 and/or backend services 108 with information around connections 124, such as health values 230 and/or metrics 228. For instance, the notification component 216 may send alerts to users associated with client applications 114 and/or backend services 108 to indicate that connections 124 and/or nodes of the services 108 are unhealthy, or moving towards being unhealthy.

Further, the computer-readable media 206 may store and/or execute a monitoring component 218. The monitoring component 218 may perform health checks using health values 230 for backend services 108 with which the client applications 114 communicate. If any time backend service 108 is unhealthy, then PCMS 102 will refresh the connection pool to initiate connections to same backend service 108 running elsewhere in another location. If there are no other healthy backend service 108 instances, then the notification component 216 may notify the client application 114 that backend service 108 is unhealthy.

The computer-readable media 206 may store and/or execute a metrics component 220 configured to generate metrics 228, which are all the configuration details and historical usage data 226. The metrics component 220 may log the times when there are no active connections 124 (in case of busy application 114). In case of non-busy application, the metrics component 220 logs only the times where are active connections 124.

The computer-readable media 206 may store and/or execute an access control component 222 configured to authenticate users, applications 114, and/or client devices 104. For instance, the access control component 222 may perform role-based access control (RBAC) from the client tier to middle tier, and/or middle tier to service tier, by restricting access based on roles associated with the users, applications 114, and/or client devices 104. Additionally, or alternatively, the access control component 222 may perform fine-grained access control to authenticate the users by using a complete set of permissions to determine access control. The computer-readable media 206 may store and/or execute a connections component 224 configured to create connections 124 with the backend services 108 and/or client devices/applications.

The backend services 108 may comprise various types of services, such as serverless function services, long-term storage services, data warehouse services, database services, and/or custom services created or hosted on behalf of users.

To utilize the services provided by the PCMS 102, the users may register for an account with the PCMS 102. For instance, users may utilize a user device to interact with an identity and access management (IAM) component (not illustrated) that allows the users to create user accounts with the PCMS 102. Generally, the IAM component may enable the users to manage their network infrastructures remotely, and view information provided by PCMS 102. Generally, the different user accounts can assume different roles, or sets or permissions/credentials, that allow network users to perform different actions, and be restricted from performing some actions.

The computer-readable media 206 may be used to store and retrieve information, such as program modules, data structures, or other data. It should be appreciated by those skilled in the art that computer-readable storage media is any available media that provides for the non-transitory storage of data and that can be accessed by the PCMS 102. In some examples, the operations performed by the PCMS 102, and or any components included therein, may be supported by one or more server devices. Stated otherwise, some or all of the operations performed by the PCMS 102, and or any components included therein, may be performed by one or more computer devices operating in a distributed arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 2C:
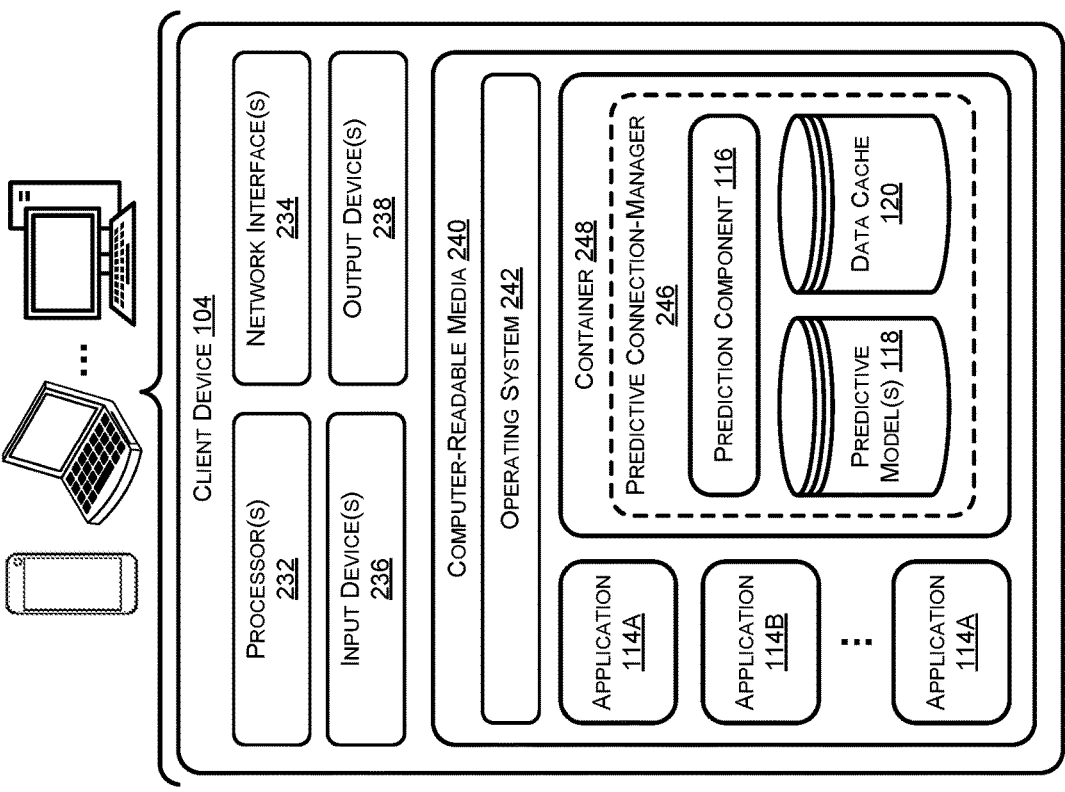
FIGS. 2B and 2C illustrate respective examples of client devices that run one or more instances of a predictive connection manager locally on the client devices.
Figure 2B:
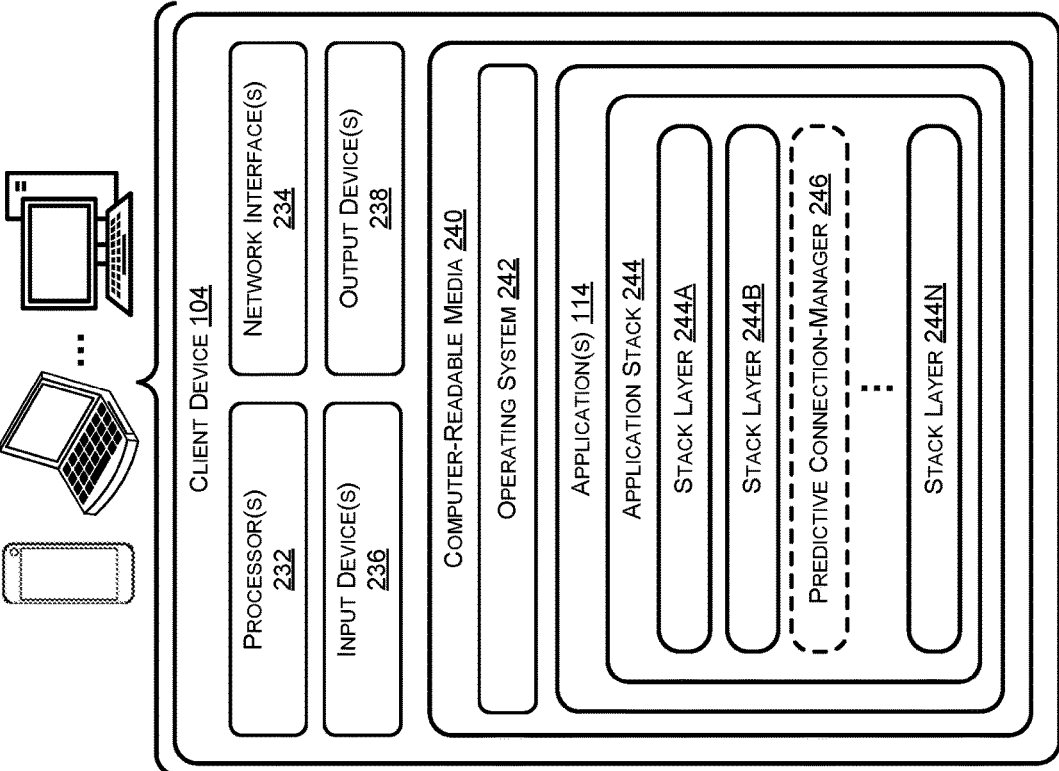

FIGS. 2B and 2C illustrate respective examples of client devices 104 that run one or more instances of a predictive connection manager 246 locally on the client devices 104. In each of FIGS. 2B and 2C, the client device 104 each include one or more hardware processors 232 (processors), one or more devices, configured to execute one or more stored instructions. The processor(s) 232 may comprise one or more cores. Further, the PCMS 102 may include one or more network interfaces 234 configured to provide communications between the client devices 104 and other devices, such as the PCMS 102 and/or other systems or devices in and/or remote from the service provider network 102. The network interfaces 234 may include devices configured to couple to various networks, such as the network(s) 110, which may include one or more of personal area networks (PANs), wired and wireless local area networks (LANs), wired and wireless wide area networks (WANs), and so forth.

The one or more network interfaces 234 such as a wireless or Wi-Fi network communications interface, an Ethernet communications interface, a cellular network communications interface, a Bluetooth communications interface, etc., for communications over various types of networks, including wide-area network, local-area networks, private networks, public networks etc. In the case of a wireless communications interfaces, such interfaces may include radio transceivers and associated control circuits and logic for implementing appropriate communication protocols.

For instance, the network interface(s) 234 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 234 may include a wide area network (WAN) component to enable communication over a wide area network. The networks may represent an array of wired networks, wireless networks, such as WiFi, or combinations thereof.

The client devices 104 may comprise any type of portable and/or fixed device and include one or more input devices 236 and output devices 238. The input devices 236 may include a keyboard, keypad, lights, mouse, touch screen, joystick, control buttons, etc. The output devices 238 may include a display, a light element (e.g., LED), a vibrator to create haptic sensations, or the like. In some implementations, one or more loudspeakers may function as output devices 238 to output audio sounds.

As shown, the client devices may each include CRM 240 that stores and/or executes various components, such as an OS 242 and one or more applications 114. FIG. 2B illustrates an example where the application(s) 114 have an application stack 244 in which the predictive connection-manager (PCM) 246 is inserted. The PCM 246 generally is the same as, or included similar or the same functionality, as PCMS 102. That is, rather than running the functionality of PCMS 102 in a data center or other location, the PCM 246 may be run on the client device 104 and perform functionality of the PCMS 102 as part of the execution of the application stack 244 of applications 114. Thus, techniques such as predictively/proactively establishing connections and/or retrieving data may be performed locally on the client device 104 and as part of execution of the application stack 244. In this way, the PCM 246 may be proactively interacting with backend services 108 on behalf of the applications 114 and at least partially prior to the user making explicit requests for data or connections.

FIG. 2C illustrates a similar example where the PCM 246 is running in a container 248 on a client device 104, rather than in the application stack 244. However, the PCM 246 similarly executes in the container 248 to perform functionality similar to, or the same as the PCMS 102. In this way, part or all of the logic and components of the PCMS 102 may be on the client devices 104 themselves such that some, or all, of the PCMS 102 may not be needed as a proxy (in some examples).

Figure 3A:
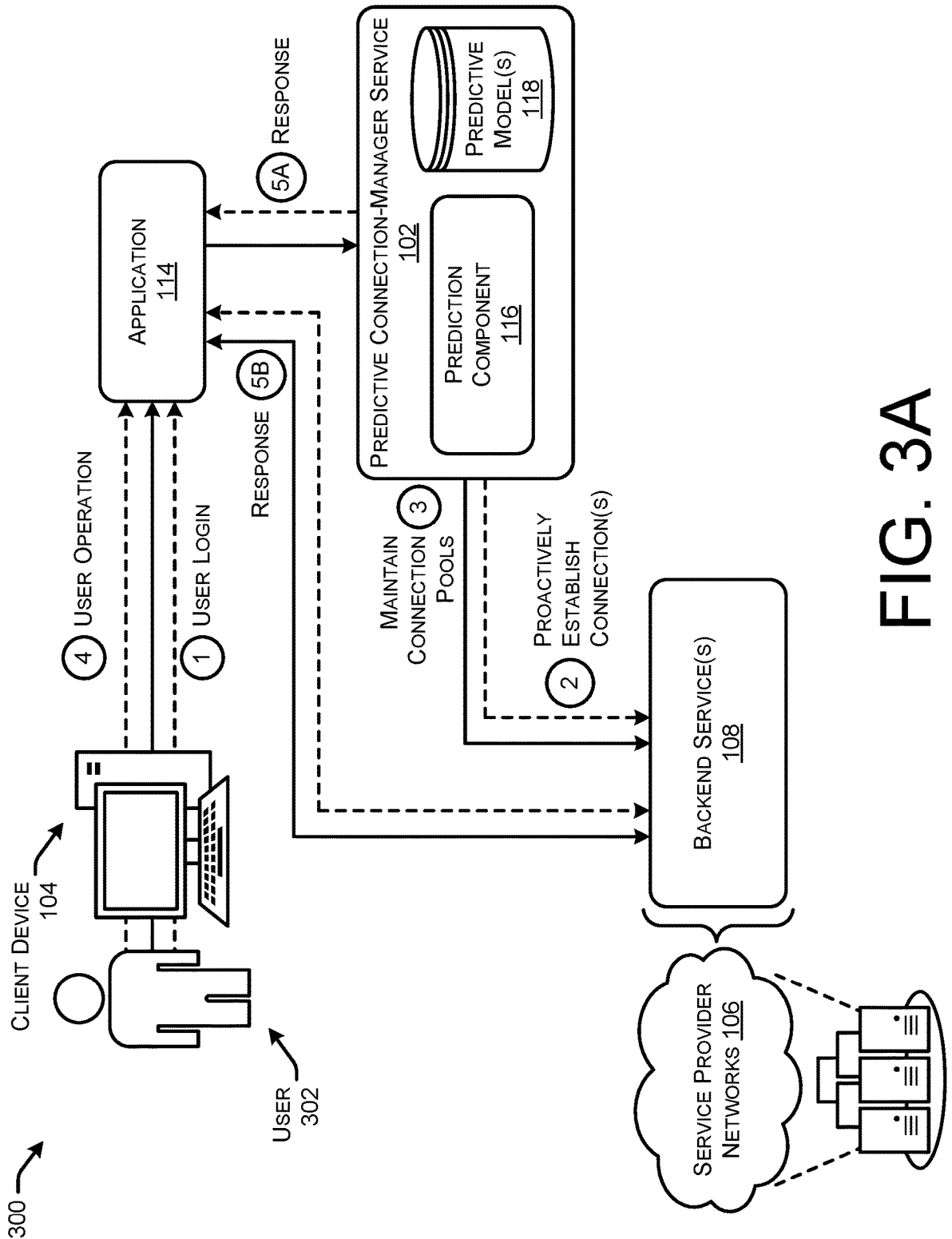
FIG. 3A illustrates a flow diagram of an example process for a PCMS to proactively establish network connections on behalf of client devices prior to the client devices requesting the connections.

FIG. 3A illustrates a flow diagram 300 of an example process for a PCMS 102 to proactively establish network connections 124 on behalf of client devices 108 prior to the client devices 108 requesting the connections.

At "1," a user 302 may login to use an application 114, such as by providing a username and password, and/or by any other authentication means. The PCMS 102 may use the login to the application as a trigger, in some instances, to proactively perform an operation. For instance, the PCMS 102 may wait to perform authenticated operations until the user 302 has logged in and authenticated themselves.

At "2." the PCMS 102 may determine to proactively establish connection(s) 124 with the backend service 108. For instance, the prediction component 116 may use the predictive models 118 to determine that the user 302 of the application 114 is likely to request the connection 124 with the particular backend service 108. In some instances, the predictive models 118 represent a prior usage pattern of the user 302 and/or client application 114 that indicates the connection 124 is generally requested by the user 302 and/or client application 114 at, or near, a current time. In some instances, the PCMS 102 may act as a proxy such that the PCMS 102 establishes connections 124 between itself and the backend service 108, and the client applications 114 communicate with the backend service 108 via the PCMS 102. In other examples, the connections 124 may be a pool of connection objects that are created and maintained by the PCMS 102. A connection object may represent a unique session with the backend service 108, and is generally equivalent to the actual network connection 124 to the backend service 108.

At "3," the PCMS 102 may maintain the connection(s) 124 on behalf of the client application 114 such that the connection(s) 124 are established prior to the client application 114 actually requesting the connection 124 (e.g., responsive to the log in).

At "4," the user 302 may provide input via the client device 104 to the application 114 that indicates a request for an operation. This request may include a request for the connection 124 to a particular backend service 108.

At "5A," because the connection 124 has been established, or is already in the process of being established, the PCMS 102 may respond to the application 114 with an indication of the connection 124 (e.g., connection details). In this way, the PCMS 102 may start creating a predicted connection 124 in response to the user 302 logging into the application 114 such that the connection 124 is prepared, or nearly prepared, once the user 302 requests an operation that includes establishing the connection 124. Step 5A illustrates an example where the client application 114 communicates with the backend service 108 via the PCMS 102 that is acting as a proxy. However, step 5B illustrates an example where the PCMS 102 provides the client application 114 with one or more connection objects to the backend service 108, and the client application 114 communicates directly with the backend service 108 using the connection object(s).

Figure 3B:
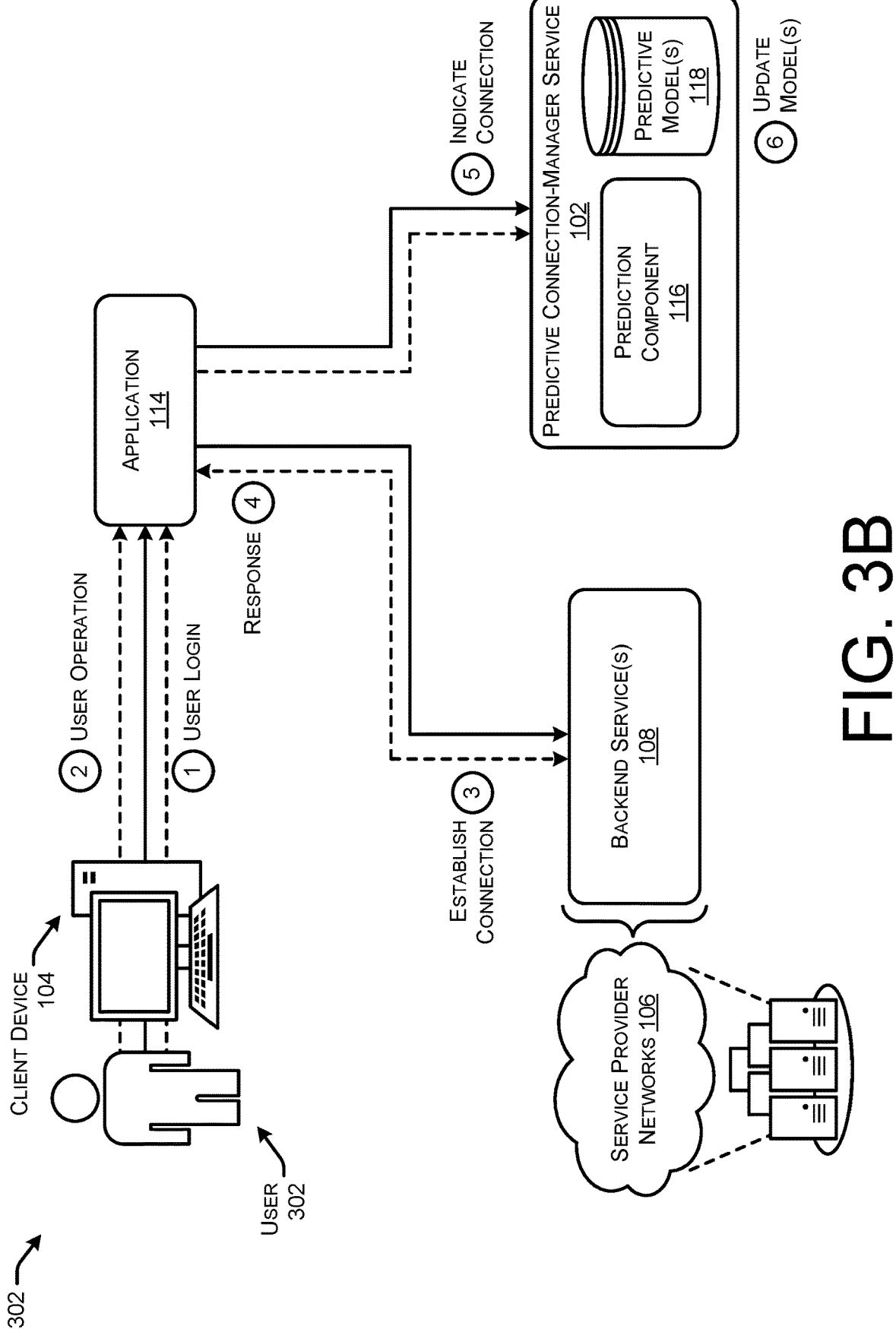
FIG. 3B illustrates a flow diagram of an example process for a client device to establish a connection to a backend service where the PCMS did not predict the connection, and the client device notifies the PCMS of the connection to update a predictive model of the PCMS.

FIG. 3B illustrates a flow diagram of an example process 302 for a client device 104 to establish a connection 124 to a backend service 108 where the PCMS 102 did not predict the connection 124, and the client device 104 notifies the PCMS 102 of the connection 124 to update a predictive model 118 of the PCMS 102.

At "1," a user 302 may login to use an application 114, such as by providing a username and password, and/or by any other authentication means. At "2," the user may perform a user operation by interacting with the application 114 that results in at least one of a request to communicate with a backend service 108, a request to obtain data from a backend service 108, and so forth. In this case, however, the login and/or associated operation may not be predicted by the PCMS 102 as the behavior or login is not part of a normal usage pattern by the user and/or application 114.

At "3," the client application 114 may reach out to the appropriate backend service 108 and establish a connection 124 based on the user operation, and receive a response to the user operation at "4" from the backend service 108 and using the connection 124. At "5," the client application 114 may indicate the connection 124 to the PCMS 102 by providing information around the connection that was established by the application 114, such as an indication of which application 114 established the connection 124, the user operation performed, the time of day, a number of connections 124 established, and/or other data associated with the connection 124. The PCMS 102 may then update the predictive models 118 based on the connection 124 made by the client application 114 such that the PCMS 102 may predict the user logging into the applications 114 and performing the operation at a future time, and take proactive actions (e.g., establishing the connection 124 in response to the log in).

Figure 4A:
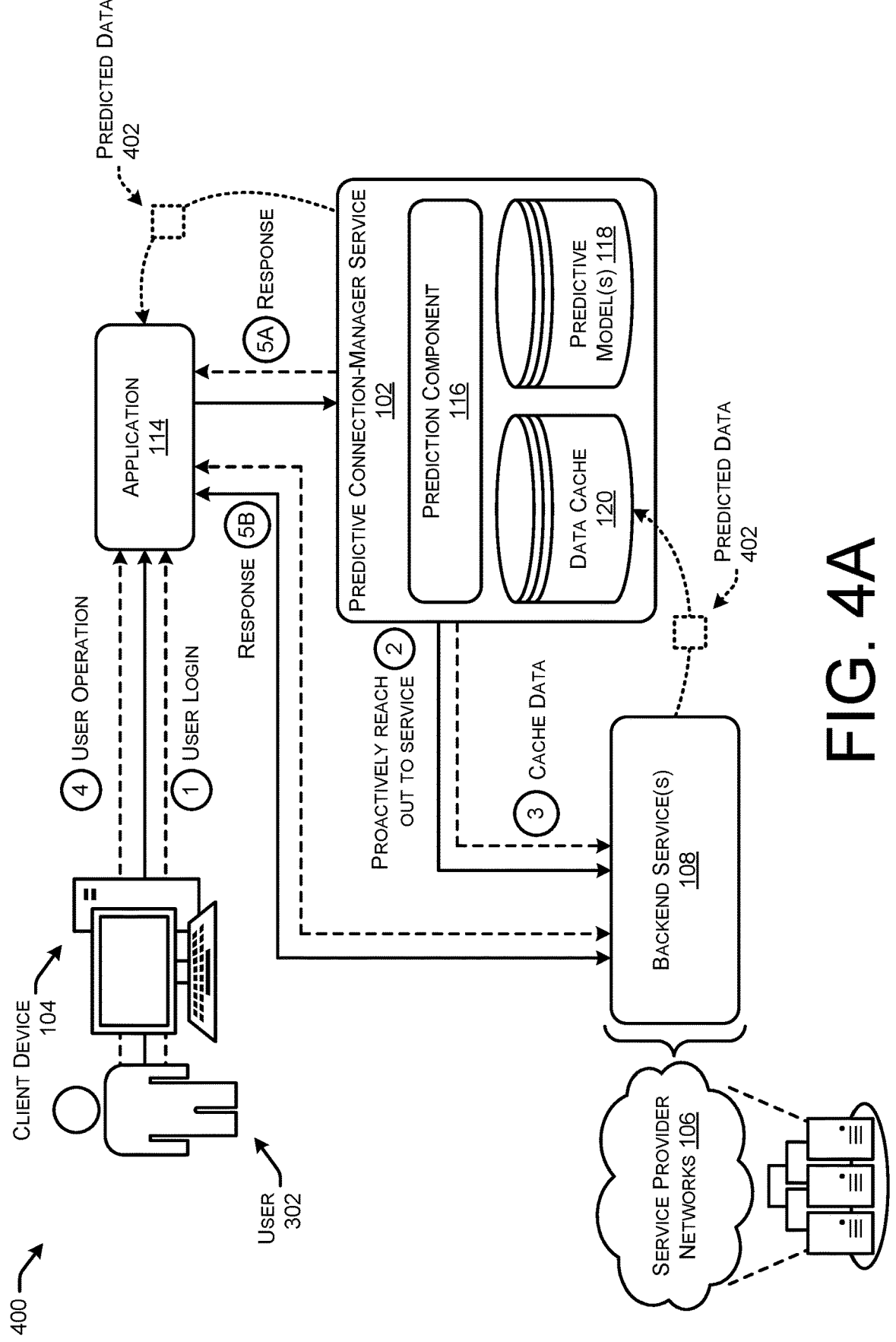
FIG. 4A illustrates a flow diagram of an example process for a PCMS to proactively retrieve and cache data on behalf of client devices prior to the client devices requesting the data.

FIG. 4A illustrates a flow diagram 400 of an example process for a PCMS 102 to proactively retrieve and cache data on behalf of client devices 104 prior to the client devices 104 requesting the data.

At "1," a user 302 may login to use an application 114, such as by providing a username and password, and/or by any other authentication means. The PCMS 102 may use the login to the application as a trigger, in some instances, to proactively perform an operation. For instance, the PCMS 102 may wait to perform authenticated operations until the user 302 has logged in and authenticated themselves.

At "2," the PCMS 102 may determine to proactively fetch predicted data 402 from a backend service 108. For instance, the prediction component 116 may use the predictive models 118 to determine that the user 302 of the application 114 is likely to request the predicted data 402 from a particular backend service 108. In some instances, the predictive models 118 represent a prior usage pattern of the user 302 and/or client application 114 that indicates the predicted data 402 is generally requested by the user 302 and/or client application 114 at, or near, a current time.

At "3," the PCMS 102 may fetch and cache the predicted data 402 on behalf of the client application 114 such that the predicted data 402 is cached prior to the client application 114 actually requesting the predicted data 402 (e.g., responsive to the log in). Additionally, or alternatively, the PCMS 102 may create connection objects usable to obtain the predicted data 402 from the backend service 108.

At "4," the user 302 may provide input via the client device 104 to the application 114 that indicates a request for a particular operation, which may include a request for the PCMS 102 to retrieve the predicted data 402.

At "5A," because the predicted data 402 has been retrieved and cached in the data cache 120, or is already in the process of being retrieved and cached in the data cache 120, the PCMS 102 may respond to the application 114 with the predicted data 402. In this way, the PCMS 102 may start retrieving data that a user 302 is likely to request via an application 114 in response to the user 302 logging into the application 114 such that the predicted data 402 is retrieved and cached 120, or nearly cached 120, once the user 302 requests the particular data 402.

Additionally, or as an alternative to step 5A, at "5B" the PCMS 102 may provide the connection object(s) to the client application 114, and the client application 114 may use the connection object to obtain the predicted data 402 from the backend service 108 itself.

Figure 4B:
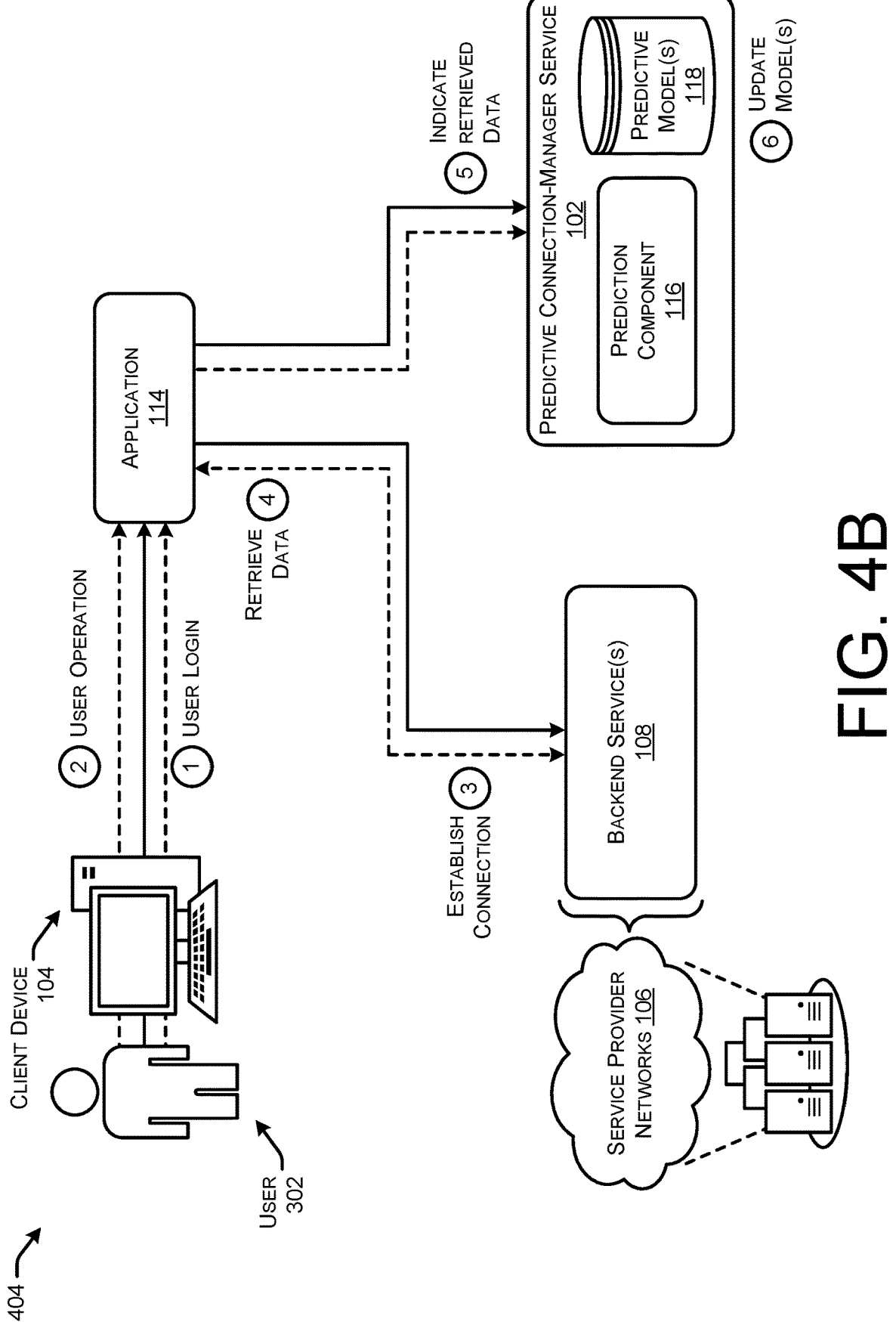
FIG. 4B illustrates a flow diagram of an example process for a client device to retrieve data from a backend service where the PCMS did not predict the data retrieval, and the client device notifies the PCMS of the data retrieval to update a predictive model of the PCMS.

FIG. 4B illustrates a flow diagram of an example process 404 for a client device 104 to retrieve data from a backend service 108 where the PCMS 102 did not predict the data retrieval, and the client device 104 notifies the PCMS 102 of the data retrieval to update a predictive model 118 of the PCMS 102.

At "1," a user 302 may login to use an application 114, such as by providing a username and password, and/or by any other authentication means. At "2," the user may perform a user operation by interacting with the application 114 that results in at least one of a request to communicate with a backend service 108, a request to obtain data from a backend service 108, and so forth. In this case, however, the login and/or associated operation may not be predicted by the PCMS 102 as the behavior or login is not part of a normal usage pattern by the user and/or application 114.

At "3," the client application 114 may reach out to the appropriate backend service 108 and establish a connection 124 based on the user operation, and retrieve the data in response to the user operation at "4" from the backend service 108 and using the connection 124. At "5," the client application 114 may indicate the connection 124 and data retrieval to the PCMS 102 by providing information around the data that was retrieved by the application 114, such as an indication of which application 114 retrieved the data, the user operation performed, the time of day, and/or other data associated with the connection 124 and/or data retrieval. The PCMS 102 may then update the predictive models 118 based on the data retrieved by the client application 114 such that the PCMS 102 may predict the user logging into the applications 114 and performing the operation at a future time, and take proactive actions (e.g., caching the data and/or creating connection objects in response to the log in).

Figure 5:
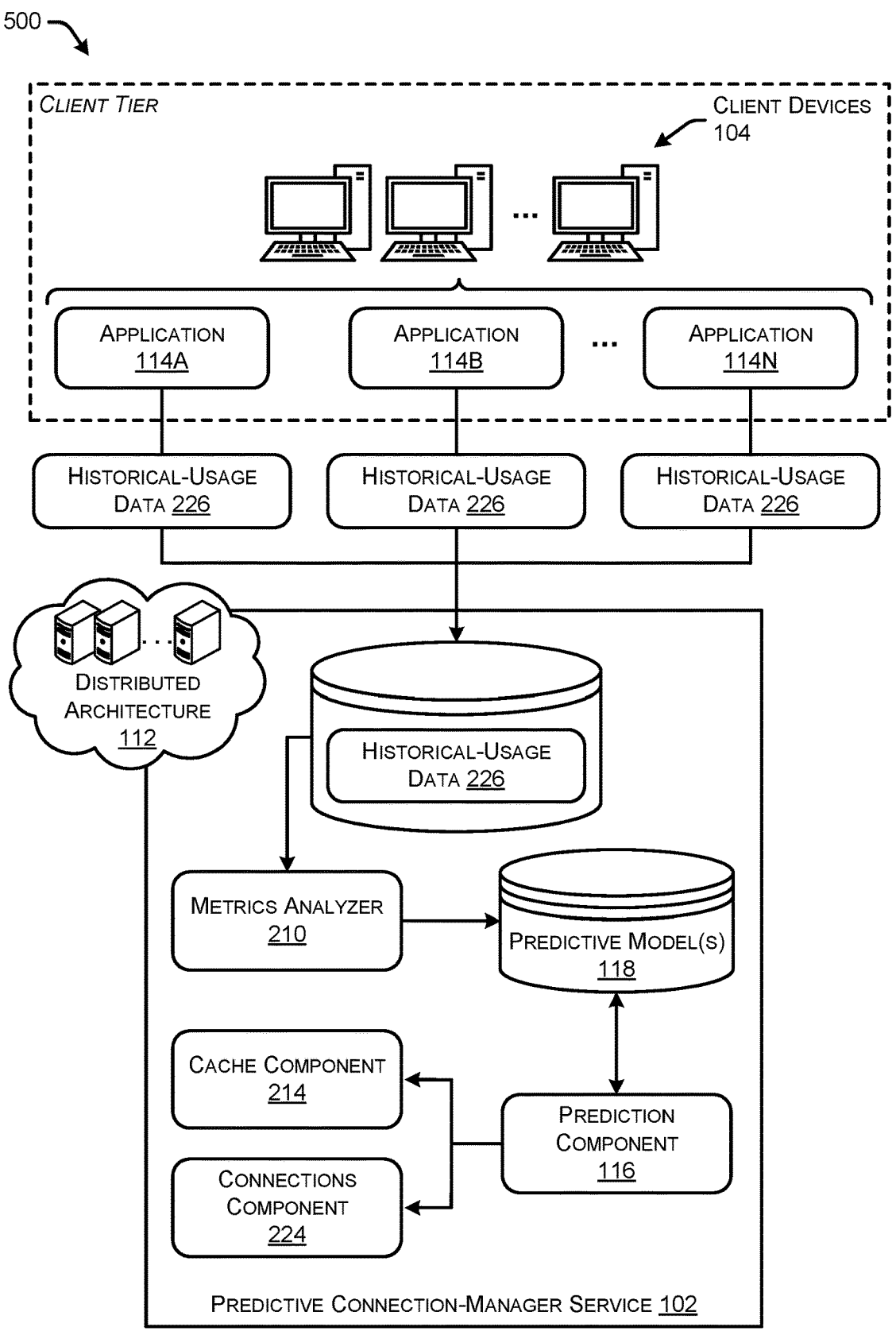
FIG. 5 illustrates a system-architecture diagram of an example environment in which a PCMS uses historical-usage data to create predictive models that represent usage patterns of client applications requesting data from, or connections to, backend services.

FIG. 5 illustrates a system-architecture diagram of an example environment 500 in which a PCMS 102 uses historical-usage data 226 to create predictive models 118 that represent usage patterns of client applications 114 requesting data from, or connections to, backend services 108.

The PCMS 102 may receive, obtain, monitor, or otherwise obtain historical usage data 226 indicating historical connections 124 previously established between client applications 114 and backend services 108. The historical-usage data 226 may indicate times at which service requests were received, client applications 114 from which the service requests were received, backend services 108 to which the services requests were sent, and types of the service requests (e.g., data requests, types and/or numbers of connections requested, etc.). The metrics analyzer 210 can analyze the historical-usage data 226 to identify usage patterns of client applications 114 with respect to sending service requests during a period of time. The metrics analyzer 210 may generate predictive models 118 (e.g., machine-learning (ML) models, heuristic- or rule-based models, etc.) that represent these usage patterns and may be used to predict when client applications 114 are likely to send service requests, and potentially predict other request information, such as types of service requests, numbers of service requests, and so forth.

The prediction component 116 may then provide the cache component 214 and connection component 224 with access to the predictive models, and/or instruct the cache component 214 and connection component 224 to predictively cache data and/or establish connections prior to predicted times indicated by the predicted models 118.

Figure 6:
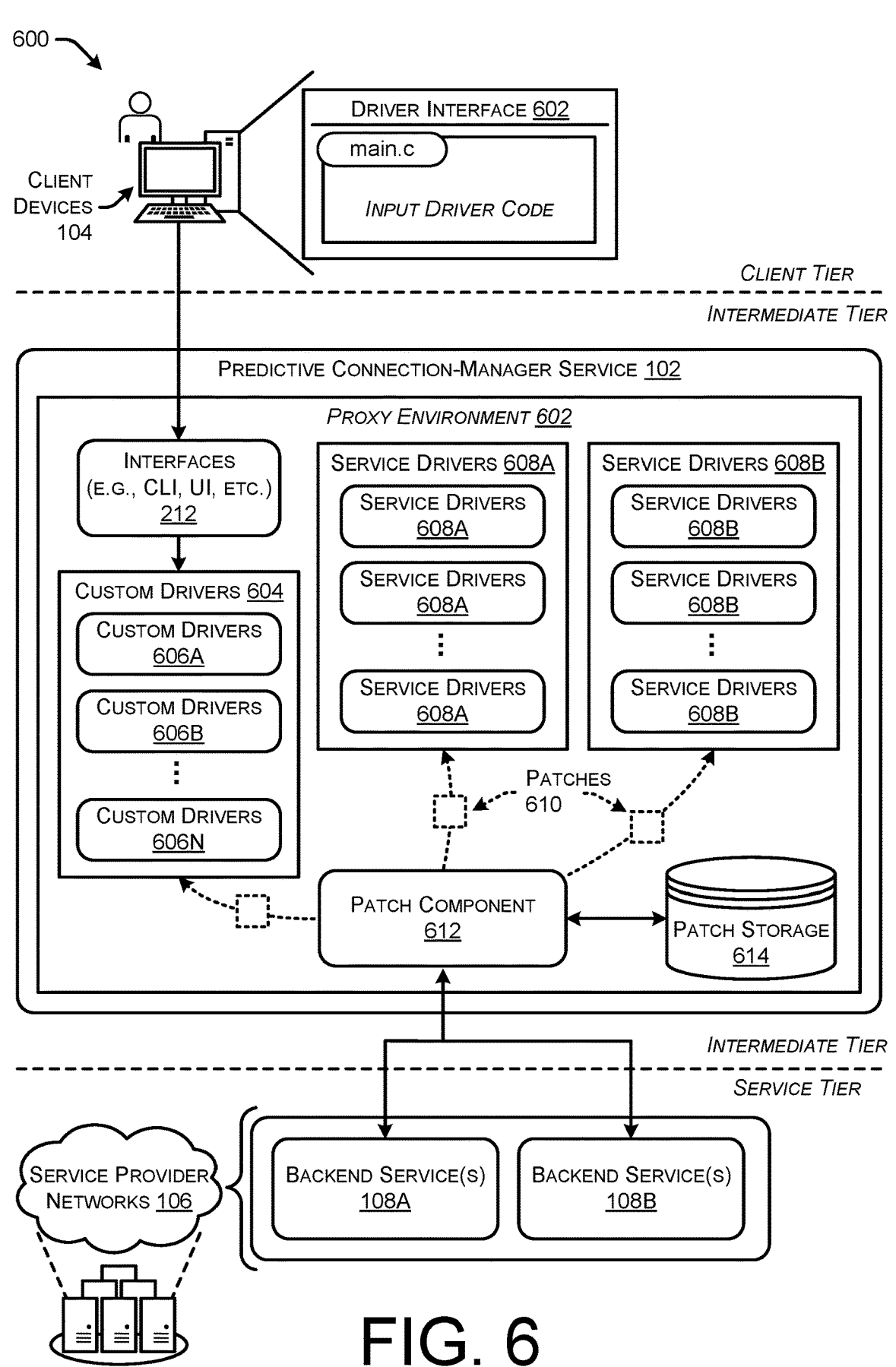
FIG. 6 illustrates a system-architecture diagram of an example environment in which PCMS allows users to build or develop custom drivers to interface with various services, and also patch service drivers on a PCMS such that the client devices are not required to patch their service drivers.

FIG. 6 illustrates a system-architecture diagram of an example environment 600 in which PCMS 102 allows users 302 to build or develop custom drivers 606 to interface with various services 108, and also patch service drivers 610 on a PCMS such that the client devices 104 are not required to patch their service drivers 610.

As shown, the PCMS 102 may expose interfaces 212, such as CLIs, APIs, UIs, and/or other interfaces 212 through which users 302 of client devices 104 may build or develop customer driver 604 (e.g., drivers 606A-606N). The custom drivers 606 may be used by the PCMS 102 to communicate with custom backend services 108 with which the PCMS 102 would otherwise be unable to communicate.

The PCMS 102 may further include service drivers 608A for backend services 108A, and service drivers 608B for backend services 108B. These service drivers 610A and 610B may enable client applications 114 to communicate with multiple service provider networks 106 hosting backend services 108 through the PCMS 102 such that the PCMS 102 may be a multi-provider connector. As shown, a patch component 612 may access patch storage 614 to identify new patches 610 that are to be installed on the different drivers 606, 608A, and/or 608B.

Figure 7:
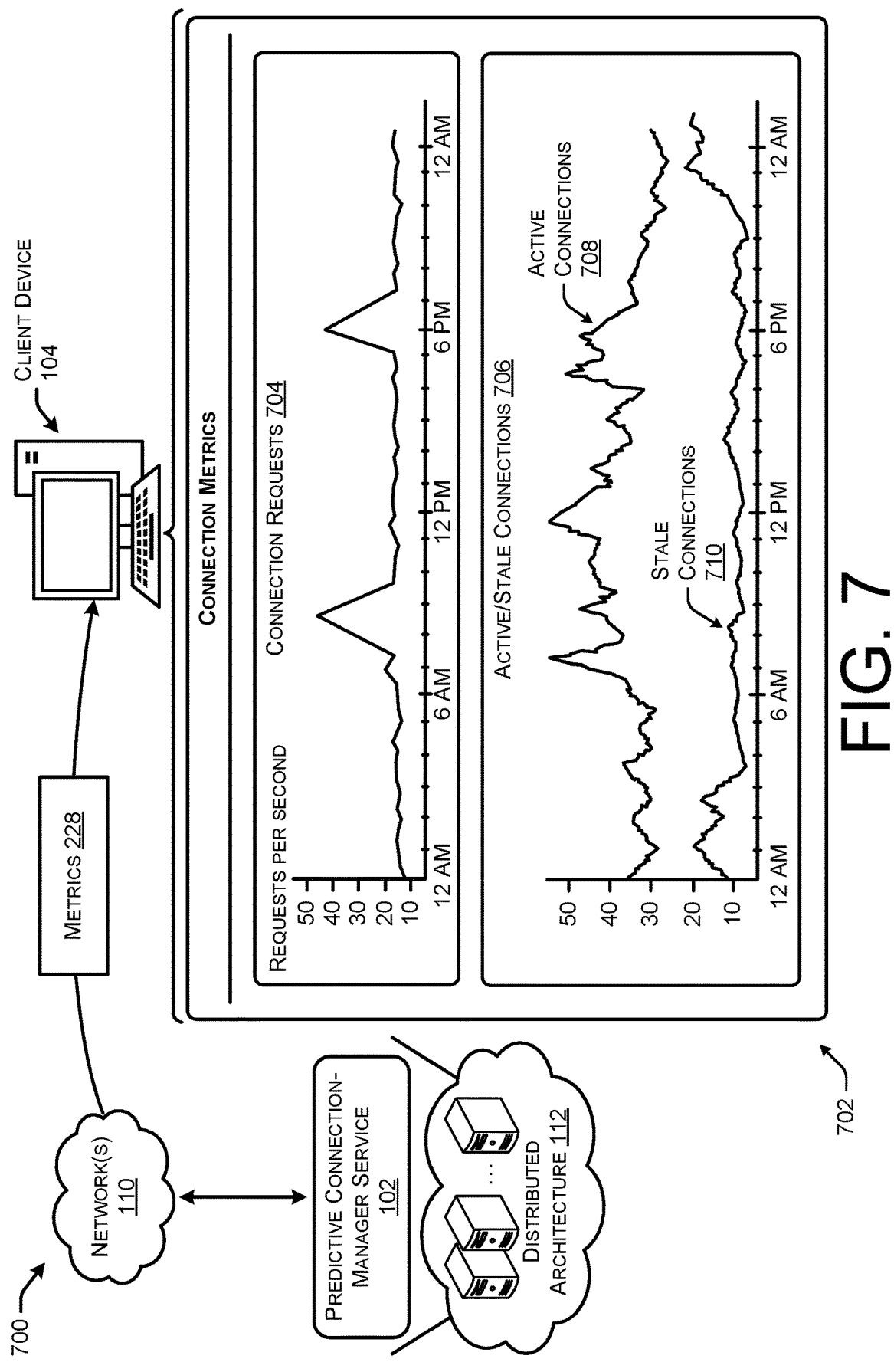
FIG. 7 illustrates a graphical user interface illustrating metrics that are presented to a user of client applications where the metrics indicate information about connections established by the PCMS and on behalf of the client applications.

FIG. 7 illustrates a graphical user interface illustrating metrics 228 that are presented to a user 302 of client applications 114 where the metrics indicate information about connections 124 established by the PCMS 102 and on behalf of the client applications 114.

The user interface 702 may illustrate connection metrics 228 for connections 128 associated with a user 302, an application 114, and/or a device 104. One illustration of metrics may be connection requests 704 where the number of connection requests received from a particular client application 114 (or user and/or device) over a period of time. Further, the user interface 702 illustrates active/stale connection 706 where active connections are connections 124 that are being used by client applications 114 and backend services 108, and stale connections are connections that are unused for more than a threshold period of time. using these metrics 706, a user 302 can see whether or not they have too many stale connections at different parts of the day, and that they can scale down the stale connections during those times of the day.

FIGS. 8-12 illustrate flow diagrams of example methods 800-1200 that illustrate aspects of the functions performed at least partly by the service provider network 106 as described in this disclosure. The logical operations described herein with respect to FIGS. 8-12 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 8-12 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 8 illustrates a flow diagram of an example method 800 for a PCMS 102 to generate and use a predictive model 118 to determine a time at which a client application 114 is likely to request connections 124 to a backend service 108 and a number of the connections 124, and to establish the number of connections 124 with the backend service 108 on behalf of the client application 114 prior to the time.

At 802, the PCMS 102 may receive historical usage data 226 that represents historical connections established between a client application 114 on a client device 104 and a backend service 108. For instance, the PCMS may receive historical usage data 226 such as data indicating times at which service requests were sent from client applications 114, client applications 114 from which the service requests were received, backend services 108 to which the services requests were sent, the types of the service requests (e.g., data requests, types and/or numbers of connections requested, etc.), and/or other data.

At 804, the PCMS 102 may analyze the historical usage data 226 to generate a predictive model 118 that models a usage pattern according to which the client application 114 established the historical connections. For instance, the PCMS 102 can analyze the historical-usage data 226 to identify usage patterns of client applications 114 with respect to sending service requests during a period of time. The PCMS 102 may generate predictive models 118 (e.g., machine-learning (ML) models, heuristic- or rule-based models, etc.) that represent these usage patterns and may be used to predict when client applications 114 are likely to send service requests, and potentially predict other request information, such as types of service requests, numbers of service requests, and so forth.

At 806, the PCMS 102 may, using the predictive model, predict (i) a time at which the client application 114 is likely to request connections 124 to the backend service 108, and

18

(ii) a number of connections 124 to the backend service 108 that the client application 114 is likely to request at the time.

At 808, the PCMS 102 may establish, prior to the time, the number of connections with the backend service 108. In some instances, the PCMS 102 may act as a proxy such that the PCMS 102 establishes connections 124 between itself and the backend service 108, and the client applications 114 communicate with the backend service 108 via the PCMS 102. In other examples, the number of connections 124 may be a pool of connection objects that are created and maintained by the PCMS 102. A connection object may represent a unique session with the backend service 108, and is generally equivalent to the actual network connection 124 to the backend service 108.

In some instances, the PCMS may establish the number of connections in response to detecting an event, such as a user logging into the client application 114. For instance, the PCMS 102 may predict that the user is likely to request the connections at a particular time, and in some instances, may wait until the user logs into the client application 114. In response to the user logging into the application 114, the PCMS 102 may then proactively establish the connections (or receive data) prior to the user submitting a request or query.

At 810, the PCMS 102 may provide the client application with access to use the number of connections with the backend service at least by the time. For instance, the connections 124 may be maintained in a pool such that, when the client application 114 connects to the proxy PCMS 102, the connections 124 are available for use. As another example, the PCMS 102 may provide the client applications 114 with access to the connection objects such that the client applications 114 can use the connection objects to the backend service 108.

FIG. 9 illustrates a flow diagram of an example method 900 for a PCMS 102 to determine a time at which a client application 114 is likely to request a connection 124 to a backend service 108, and to establish the connection 124 with the backend service 108 on behalf of the client application 114 prior to the time.

At 902, the PCMS 102 may receive historical data that represents historical connections previously established between a client application of a client device and a backend service of a service provider network. For instance, the PCMS may receive historical usage data 226 such as data indicating times at which service requests were sent from client applications 114, client applications 114 from which the service requests were received, backend services 108 to which the services requests were sent, the types of the service requests (e.g., data requests, types and/or numbers of connections requested, etc.), and/or other data.

At 904, the PCMS 102 may determine, using the historical data, a time at which the client application 114 is likely to request a connection 124 to the backend service 108. For instance, the PCMS 102 can analyze the historical-usage data 226 to identify usage patterns of client applications 114 with respect to sending service requests during a period of time. The PCMS 102 may use these usage patterns to predict when client applications 114 are likely to send service requests, and potentially predict other request information, such as types of service requests, numbers of service requests, and so forth.

At 906, the PCMS 102 may establish, prior to the time, the connection 124 between the connection-manager system and the backend service. In some instances, the PCMS 102 may act as a proxy such that the PCMS 102 establishes a connection 124 between itself and the backend service 108, and the client applications 114 communicate with the back-end service 108 via the PCMS 102. In other examples, the connection 124 may be a connection object that is created by the PCMS 102. A connection object may represent a unique session with the backend service 108, and is generally equivalent to the actual network connection 124 to the backend service 108. The PCMS 102 may indicate the connection object to the client application 114 for use by the client application 114 such that the client application 114 reaches out to the backend service 108 directly.

At 908, the PCMS 102 may provide the client application with access to use the connection with the backend service at least by the time. For instance, the connection 124 may be maintained such that, when the client application 114 connects to the proxy PCMS 102, the connection 124 is avail-able for use. As another example, the PCMS 102 may provide the client application 114 with access to the con-nection object such that the client application 114 can use the connection object to connect directly to the backend service 108.

FIG. 10 illustrates a flow diagram of an example method 1000 for a PCMS 102 to determine a time at which a client application 114 is likely to request a particular data from a backend service 108, and to retrieve and cache the particular data on behalf of the client application prior to the time.

At 1002, the PCMS 102 may receive historical data that represents historical connections previously established between a client application of a client device and a backend service of a service provider network. For instance, the PCMS may receive historical usage data 226 such as data indicating times at which data requests were sent from client applications 114, client applications 114 from which the data requests were received, backend services 108 to which the services requests were sent, the types of the data requested, and/or other data.

At 1004, the PCMS 102 may determine, using the his-torical data, a time at which the client application is likely to request particular data from the backend service. For instance, the PCMS 102 can analyze the historical-usage data 226 to identify usage patterns of client applications 114 with respect to sending data requests during a period of time. The PCMS 102 may use these usage patterns to predict when client applications 114 are likely to send data requests, and potentially predict other request information, such as types of data requests, numbers of data requests, and so forth.

At 1006, the PCMS 102 may obtain, prior to the time, the particular data 402 from the backend service 108. At 1008, the PCMS 102 may cache the particular data 402 in a data cache 120 of the connection-manager service 102.

At 1010, the PCMS 102 may provide the client applica-tion 114 with access to the particular data 402 at least by the time. For instance, the particular data 402 may be cached in the data cache 120 and the particular data 402 may be made accessible to the client application 114 in response to receiving a request.

FIG. 11 illustrates a flow diagram of an example method 1100 for a PCMS 102 to install a software driver 608 to communicate with a backend service 108, update the soft-ware driver 308 using a software patch 610, and using the updated software driver to establish connections with the backend service 108 on behalf of a client application 114.

At 1102, the PCMS 102 may receive input data from the client devices indicating a backend service of the service provider network with which each of the client devices desire to communicate. At 1104, the PCMS 102 may install a software driver that is usable to communicate with the backend service.

In some instances, the PCMS 102 may provide a user of the connection-manager system with access to an interface 602 through which the user develops a software driver associated with a backend service 102. The PCMS 102 may then install the software driver that is usable to communicate with the backend service on behalf of the user.

At 1106, the PCMS 102 may receive a software patch for updating the software driver. In some instances, the software driver 608 was installed with a zero day vulnerability in a library associated with the software driver 608, and the software patch 608 remedies the zero day vulnerability in the library.

At 1108, the PCMS 102 may use the software patch 610 to update the software driver 608 to result in an updated software driver 608. In this way, each client application 114 does not need to be individually updated with the software patch 610.

At 1110, the PCMS 102 may establish connections 124 with the backend service 108 on behalf of the client devices 104 and at least partly using the updated software driver 608 such that the client devices 104 are not required to update respective software drivers 608 using the software patch 610.

FIG. 12 illustrates a flow diagram of an example method 1200 for a PCMS 102 to install software drivers 608 to communicate with backend services 108 of at least two service provider networks 102, and acting as a proxy and using the drivers 608, establishing connections with the at least two service provider networks.

At 1202, the PCMS 102 may receive a first indication of a first backend service of a first service provider network 108 with which first client devices desire to communicate. At 1204, the PCMS 102 may install a first driver 608 that is usable to communicate with the first backend service 108. At 1206, the PCMS 102 may receive a second indication of a second backend service of a second service provider net-work with which second client devices desire to communi-cate. At 1208, the PCMS 102 may install a second driver that is usable to communicate with the second backend service. The first and second backend services 108 may be managed or supported by different service providers (e.g., multi-cloud environment, hybrid-cloud environment, etc.).

At 1210, the PCMS 102 may establish first connections with the first backend service on behalf of the first client devices using the first driver. At 1212, the PCMS 102 may establish second connections with the second backend ser-vice on behalf of the second client devices using the second driver. In this way, application(s) 114 are able to commu-nicate with different service provider networks through the same PCMS 102 proxy mechanism.

Figure 13:
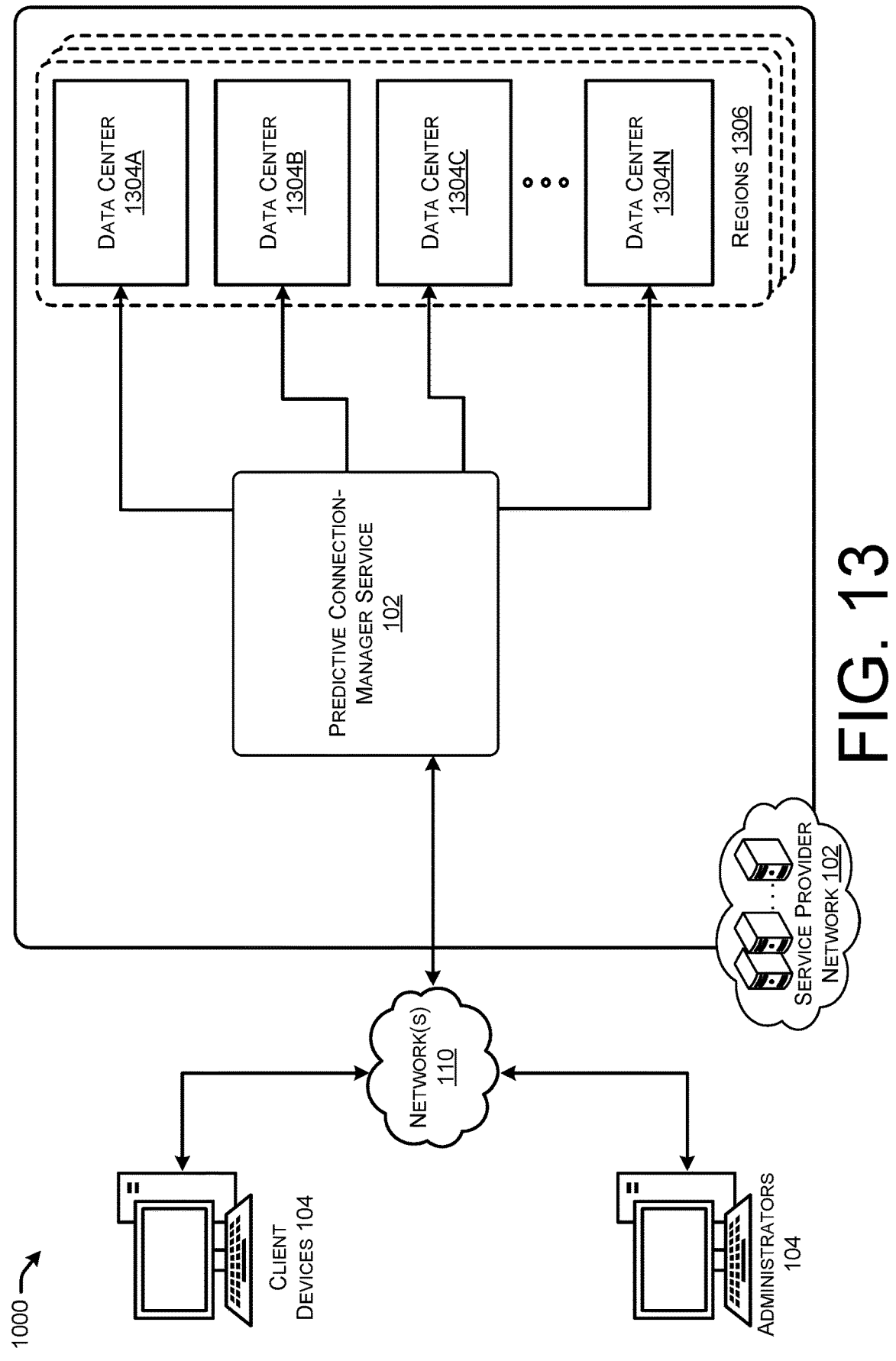
FIG. 13 is a system and network diagram that shows an illustrative operating environment that includes data centers of a service provider network that can be configured to implement aspects of the functionality described herein.

FIG. 13 is a system and network diagram 1300 that shows an illustrative operating environment that includes data centers 1304 in one or more regions 1306 of a service provider network 106 that can be configured to implement aspects of the functionality described herein. The service provider network 106 can provide computing resources, like VM instances and storage, on a permanent or an as-needed basis. Among other types of functionality, the computing resources provided by the service provider network 106 may be utilized to implement the various services described above. As also discussed above, the computing resources provided by the service provider network 106 can include various types of computing resources, such as data process-ing resources like VM instances, data storage resources, networking resources, data communication resources, net-work services, and the like.

Each type of computing resource provided by the service provider network 106 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 106 can also be configured to provide other types of computing resources not mentioned specifically herein.

The computing resources provided by the service provider network 106 may be enabled in one embodiment by one or more data centers 1304A-1304N (which might be referred to herein singularly as "a data center 1304" or in the plural as "the data centers 1304"). The data centers 1304 are facilities utilized to house and operate computer systems and associated components. The data centers 1304 typically include redundant and backup power, communications, cooling, and security systems. The data centers 1304 can also be located in geographically disparate locations, or regions 1308. One illustrative embodiment for a data center 1304 that can be utilized to implement the technologies disclosed herein will be described below with regard to FIG. 14.

The users, such as administrators, of the client devices 108 that utilize the service provider network 106 may access the computing resources provided by the service provider network 106 over any wired and/or wireless network(s) 110, which can be a wide area communication network ("WAN"), such as the Internet, an intranet or an Internet service provider ("ISP") network or a combination of such networks. For example, and without limitation, a user device operated by a user 302 of the service provider network 106 may be utilized to access the service provider network 106 by way of the network(s) 110. It should be appreciated that a local-area network ("LAN"), the Internet, or any other networking topology known in the art that connects the data centers 1304 to remote clients and other users can be utilized. It should also be appreciated that combinations of such networks can also be utilized.

Figure 14:
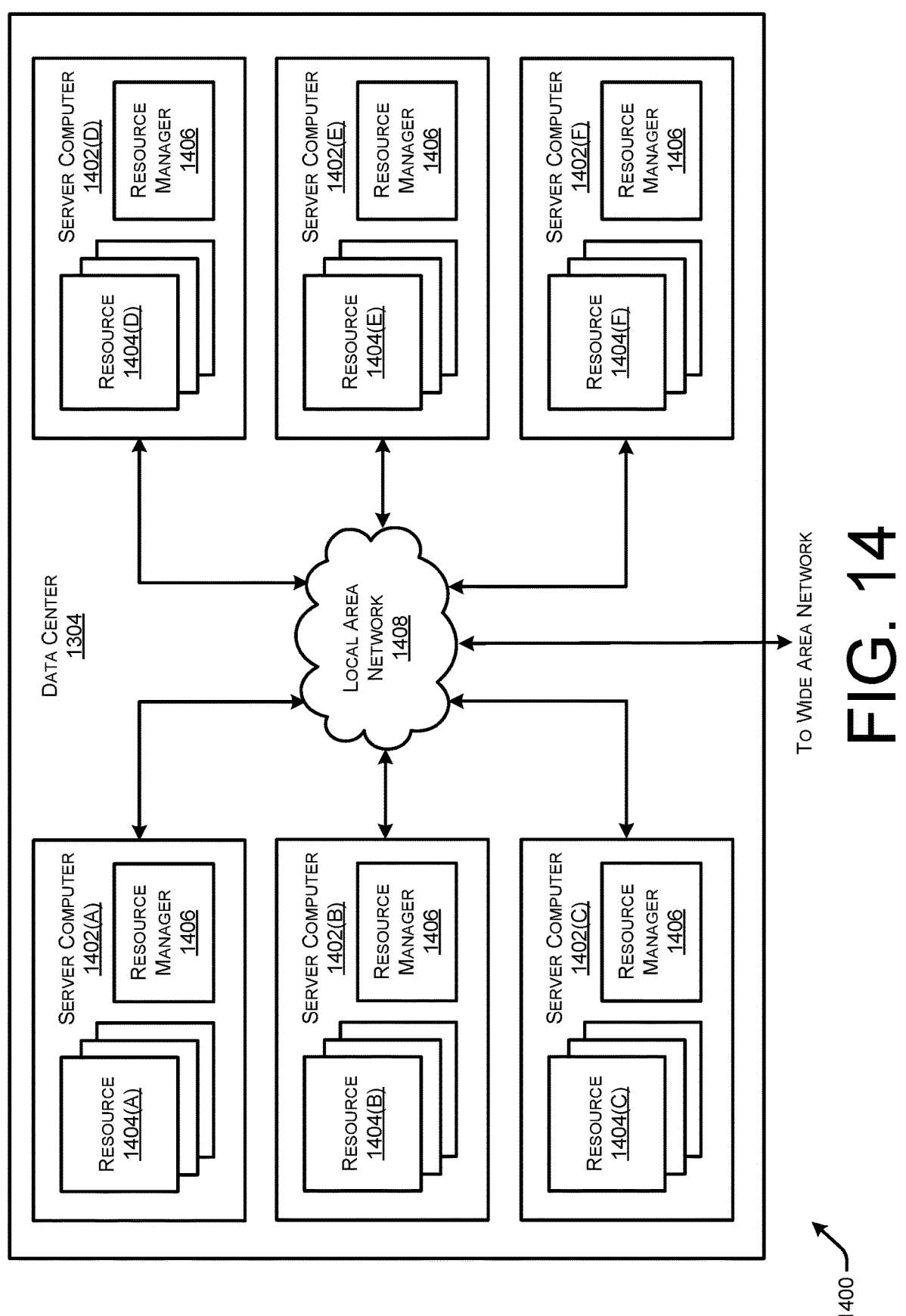
FIG. 14 is a computing system diagram illustrating a configuration for a data center that can be utilized to implement aspects of the technologies disclosed herein.

FIG. 14 is a computing system diagram 1400 that illustrates one configuration for a data center 1304 that implements aspects of the technologies disclosed herein. The example data center 1304 shown in FIG. 14 includes several server computers 1402A-1402F (which might be referred to herein singularly as "a server computer 1402" or in the plural as "the server computers 1402") for providing computing resources 1404A-1404E. In some examples, the resources 1404 and/or server computers 1402 may include, be included in, or correspond to, the computing devices described herein.

The server computers 1402 can be standard tower, rackmount, or blade server computers configured appropriately for providing the computing resources described herein (illustrated in FIG. 14 as the computing resources 1404A-1404E). As mentioned above, the computing resources provided by the service provider network 106 can be data processing resources such as VM instances or hardware computing systems, database clusters, computing clusters, storage clusters, data storage resources, database resources, networking resources, and others. Some of the servers 1402 can also be configured to execute a resource manager 1406 capable of instantiating and/or managing the computing resources. In the case of VM instances, for example, the resource manager 1406 can be a hypervisor or another type of program configured to enable the execution of multiple VM instances on a single server computer 1402. Server computers 1402 in the data center 1304 can also be configured to provide network services and other types of services.

In the example data center 1304 shown in FIG. 14, an appropriate LAN 1408 is also utilized to interconnect the server computers 1402A-1402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1404A-1404N, between each of the server computers 1402A-1402F in each data center 1304, and, potentially, between computing resources in each of the server computers 1402. It should be appreciated that the configuration of the data center 1304 described with reference to FIG. 14 is merely illustrative and that other implementations can be utilized.

Figure 15:
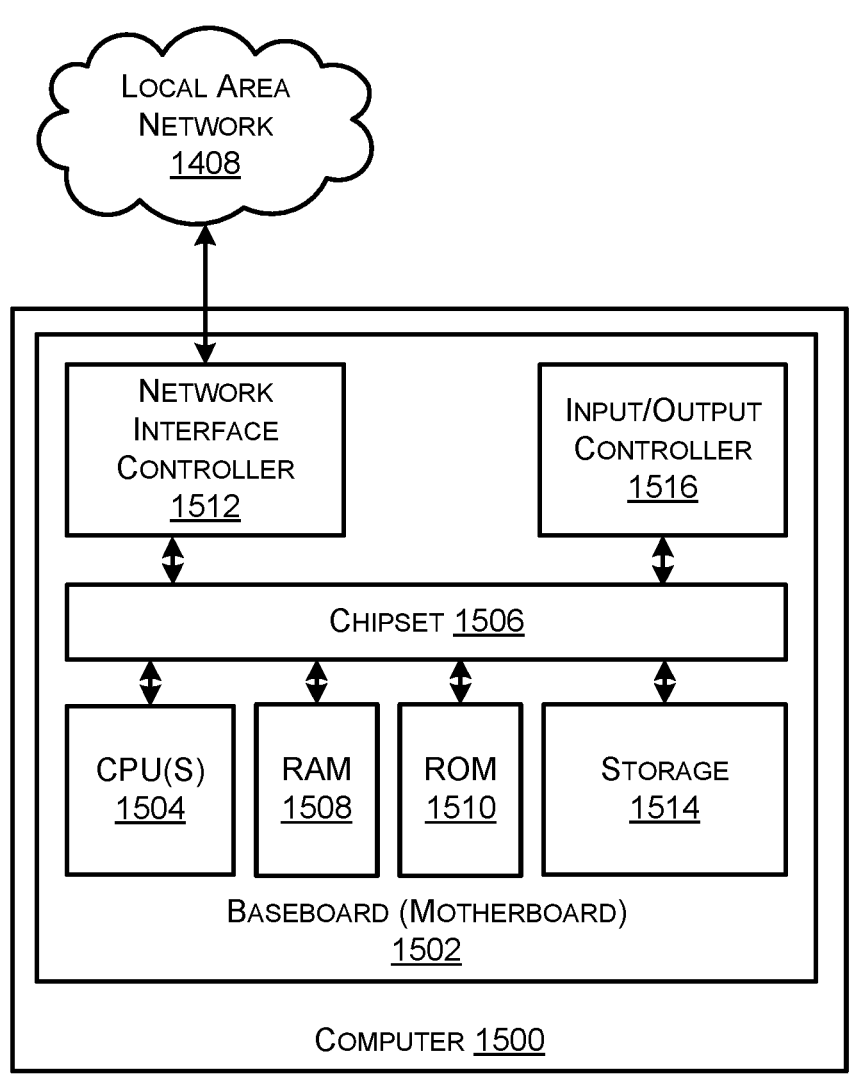
FIG. 15 is a computer architecture diagram showing an illustrative computer hardware architecture for implementing a computing device that can be utilized to implement aspects of the various technologies presented herein.

FIG. 15 shows an example computer architecture for a computer 1500 capable of executing program components for implementing the functionality described above. The computer architecture shown in FIG. 15 illustrates a conventional server computer, workstation, desktop computer, laptop, tablet, network appliance, e-reader, smartphone, or other computing device, and can be utilized to execute any of the software components presented herein.

The computer 1500 includes a baseboard 1502, or "motherboard," which is a printed circuit board to which a multitude of components or devices can be connected by way of a system bus or other electrical communication paths. In one illustrative configuration, one or more central processing units ("CPUs") 1504 operate in conjunction with a chipset 1506. The CPUs 1504 can be standard programmable processors that perform arithmetic and logical operations necessary for the operation of the computer 1500.

The CPUs 1504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1506 provides an interface between the CPUs 1504 and the remainder of the components and devices on the baseboard 1502. The chipset 1506 can provide an interface to a RAM 1508, used as the main memory in the computer 1500. The chipset 1506 can further provide an interface to a computer-readable storage medium such as a read-only memory ("ROM") 1510 or non-volatile RAM ("NVRAM") for storing basic routines that help to startup the computer 1500 and to transfer information between the various components and devices. The ROM 1510 or NVRAM can also store other software components necessary for the operation of the computer 1500 in accordance with the configurations described herein.

The computer 1500 can operate in a networked environment using logical connections to remote computing devices and computer systems through a network, such as the network 1508. The chipset 1506 can include functionality for providing network connectivity through a network interface controller (NIC) 1512, such as a gigabit Ethernet adapter. The NIC 1512 is capable of connecting the computer 1500 to other computing devices over the network 1508 (or 140). It should be appreciated that multiple NICs 1512 can be present in the computer 1500, connecting the computer to other types of networks and remote computer systems.

The computer 1500 can include storage 1514 (e.g., disk) that provides non-volatile storage for the computer. The storage 1514 can consist of one or more physical storage units. The storage 1514 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1500 can further read information from the storage 1514 by detecting the physical states or characteristics of one or more particular locations within the physical storage units.

In addition to the storage 1514 described above, the computer 1500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1500. In some examples, the operations performed by the service provider network 106, and or any components included therein, may be supported by one or more devices similar to computer 1500. Stated otherwise, some or all of the operations performed by the service provider network 106, and or any components included therein, may be performed by one or more computer devices 1500 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1514 can store an operating system utilized to control the operation of the computer 1500. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1514 can store other system or application programs and data utilized by the computer 1500.

In one embodiment, the storage 1514, RAM 1508, ROM 1510, and/or other computer-readable storage media may be encoded with computer-executable instructions which, when loaded into the computer 1500, transform the computer from a general-purpose computing system into a special-purpose computer capable of implementing the embodiments described herein. These computer-executable instructions transform the computer 1500 by specifying how the CPUs 1504 transition between states, as described above. According to one embodiment, the computer 1500 has access to computer-readable storage media storing computer-executable instructions which, when executed by the computer 1500, perform the various techniques described above. The computer 1500 can also include computer-readable storage media having instructions stored thereupon for performing any of the other computer-implemented operations described herein.

The computer 1500 can also include one or more input/output controllers 1516 for receiving and processing input from a number of input devices, such as a keyboard, a mouse, a touchpad, a touch screen, an electronic stylus, or other type of input device. Similarly, an input/output controller 1516 can provide output to a display, such as a computer monitor, a flat-panel display, a digital projector, a printer, or other type of output device. It will be appreciated that the computer 1500 might not include all of the components shown in FIG. 15, can include other components that are not explicitly shown in FIG. 15, or might utilize an architecture completely different than that shown in FIG. 15.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented performed at least partly by a client device, comprising:

running a client application on the client device, wherein the client application establishes connections between the client device and a backend service of a service provider network;

storing, on the client device, a predictive model that models a usage pattern according to which the client application established historical connections with the backend service;

determining, by a connection manager running on the client device and using the predictive model, a time at which the client application is likely to request a connection to the backend service;

causing the client device to establish the connection with the backend service prior to the time; and providing the client application with access to use the connection with the backend service at least by the time.

2. The method of claim 1, wherein the connection manager is included in an application stack of the client application such that the connection manager is executed as part of the client application being run.

3. The method of claim 1, further comprising:
running a container on the client device;
running the connection manager in the container; and
storing the predictive model in the container.

4. The method of claim 1, further comprising:
determining, using the predictive model, a number of connections to the backend service that the client application is likely to request at the time;
establishing, by the connection manager and prior to the time, the number of connections with the backend service; and
providing the client application with access to use the number of connections with the backend service at least by the time.

5. The method of claim 4, further comprising:
determining, by the connection manager, a rate limit indicating a threshold number of connections that the client application is permitted to establish during a period of time;
identifying a number of connection requests initiated by the client application that violates the rate limit; and
preventing, by the connection manager, the client application from establishing a number of connections on behalf of the client application that exceeds the rate limit.

6. The method of claim 1, further comprising:
determining, by the connection manager, particular data that the client application is likely to request from the backend service at the time;
obtaining, by the connection manager, the particular data from the backend service prior to the time;
caching the particular data in a data cache of the client device prior to the time; and
retrieving, by the connection manager, the particular data from the data cache in response to the client application requesting the particular data.

7. The method of claim 1, wherein the time is a first time, further comprising:
establishing a first number of connections between the client device and the backend service for the client application;
predicting, by the connection manager, a second time at which the client application is to reduce usage of the first number of connections to usage of a second number of connections; and
reducing the first number of connections to the second number of connections based at least in part on the second time.

8. A client device comprising:
one or more network interfaces;
one or more processors; and
one or more computer-readable media storing computer-executable instructions that, when executed by the one or more processors, cause the one or more processors to perform operations comprising:
executing an application that establishes connections between the client device and a backend service of a service provider network;
storing a predictive model that models a usage pattern according to which the client application established historical connections with the backend service;
determining, by a connection manager running on the client device and using the predictive model, (i) a time at which the client application is likely to request connections to the backend service, and (ii)

a number of connections to the backend service that the client application is likely to request at the time;
establishing, using the one or more network interfaces, the number of connections with the backend service prior to the time; and
providing the client application with access to use the number of connections with the backend service at least by the time.

9. The client device of claim 8, further comprising memory, the operations further comprising:
storing an application stack of the client application in the memory; and
storing code of the connection manager in a layer of the application stack;
wherein the connection manager is executed as part of the client application being executed.

10. The client device of claim 8, the operations further comprising:
executing a container;
executing the connection manager in the container; and
storing the predictive model in the container.

11. The client device of claim 8, the operations further comprising:
determining, by the connection manager, a rate limit indicating a threshold number of connections that the client application is permitted to establish during a period of time;
identifying a number of connection requests initiated by the client application that violates the rate limit; and
preventing, by the connection manager, the client application from establishing a number of connections on behalf of the client application that exceeds the rate limit.

12. The client device of claim 8, the operations further comprising:
determining, by the connection manager, particular data that the client application is likely to request from the backend service at the time;
obtaining, by the connection manager, the particular data from the backend service prior to the time;
caching the particular data in a data cache of the client device prior to the time; and
retrieving, by the connection manager, the particular data from the data cache in response to the client application requesting the particular data.

13. The client device of claim 8, wherein the time is a first time, the operations further comprising:
establishing a first number of connections between the client device and the backend service for the client application;
predicting, by the connection manager, a second time at which the client application is to reduce usage of the first number of connections to usage of a second number of connections; and
reducing the first number of connections to the second number of connections based at least in part on the second time.

14. A method comprising:
receiving, at a connection-manager service, historical data that represents historical connections previously established between a client application of a client device and a backend service of a service provider network;
determining, by the connection-manager service and using the historical data, a time at which the client application is likely to request particular data from the backend service;

caching a set of permissions associated with the client application;

prior to obtaining the particular data, determining that the client application is permitted to access the particular data based at least in part on the set of permissions;

obtaining, at the connection-manager service and prior to the time, the particular data from the backend service;

caching the particular data in a data cache of the connection-manager service; and providing the client application with access to the particular data at least by the time.

15. The method of claim 14, further comprising:

determining, using the historical data, that the client application is likely to request a connection to the backend service at the time;

establishing, prior to the time, the connection between the connection-manager service and the backend service; and providing the client application with access to use the connection with the backend service at least by the time.

16. The method of claim 14, further comprising:

determining, using the historical data, a number of connections to the backend service that the client application is likely to request at the time;

establishing, by the connection-manager service and prior to the time, the number of connections with the backend service; and providing the client application with access to use the number of connections with the backend service at least by the time.

17. The method of claim 14, further comprising:

establishing, by the connection-manager service, a set of connections with the backend service on behalf of the client application;

monitoring, by the connection-manager service, the set of connections established on behalf of the client application;

determining a metric associated with the set of connections; and providing a user associated with the client application with access to the metric.

18. The method of claim 14, further comprising establishing a set of connections with the backend service on behalf of the client application, wherein:

the connection-manager service comprises a cluster of containers running in a data center of the service provider network, the connection-manager service serving as a proxy between the client device and the backend service;

individual containers of the cluster of containers establish individual connections of the set of connections with the backend service; and establishing the set of connections with the backend service includes scaling up a respective number of containers in the cluster of containers to establish the set of connections.

19. The method of claim 14, further comprising:

determining a rate limit indicating a threshold number of connections that the client application is permitted to establish during a period of time;

receiving, from the client application, a number of connection requests that violates the rate limit; and refraining from establishing a number of connections on behalf of the client application that exceeds the rate limit.

20. A method comprising:

receiving, at a connection-manager service, historical data that represents historical connections previously established between a client application of a client device and a backend service of a service provider network;

determining, by the connection-manager service and using the historical data, a time at which the client application is likely to request particular data from the backend service;

obtaining, at the connection-manager service and prior to the time, the particular data from the backend service;

caching the particular data in a data cache of the connection-manager service;

providing the client application with access to the particular data at least by the time;

determining a rate limit indicating a threshold number of connections that the client application is permitted to establish during a period of time;

receiving, from the client application, a number of connection requests that violates the rate limit; and refraining from establishing a number of connections on behalf of the client application that exceeds the rate limit.

* * * * *